United States Patent
Benjamin-Deckert et al.

(10) Patent No.: US 12,242,498 B2
(45) Date of Patent: Mar. 4, 2025

(54) STORING UNSTRUCTURED DATA IN A STRUCTURED FRAMEWORK

(71) Applicant: International Business Machines Corporation, Armonk, NY (US)

(72) Inventors: Debra J. Benjamin-Deckert, San Jose, CA (US); Neal E. Bohling, San Jose, CA (US); Elaine Lai, San Jose, CA (US); Lawrence L. Law, Saratoga, CA (US); Brian Lee, San Jose, CA (US); Terri A. Menendez, Richmond, MA (US); Gary Pizl, San Jose, CA (US); Roity Prieto Perez, San Jose, CA (US); Tony Xu, Sunnyvale, CA (US)

(73) Assignee: International Business Machines Corporation, Armonk, NY (US)

( * ) Notice: Subject to any disclaimer, the term of this patent is extended or adjusted under 35 U.S.C. 154(b) by 776 days.

(21) Appl. No.: 15/839,644

(22) Filed: Dec. 12, 2017

(65) Prior Publication Data

US 2019/0179948 A1    Jun. 13, 2019

(51) Int. Cl.
*G06F 16/25*    (2019.01)
*G06F 16/2453*    (2019.01)
(Continued)

(52) U.S. Cl.
CPC ........ *G06F 16/258* (2019.01); *G06F 16/2453* (2019.01); *G06F 16/3332* (2019.01); *G06F 16/81* (2019.01); *G06F 16/86* (2019.01)

(58) Field of Classification Search
CPC ........ G06F 16/81; G06F 16/258; G06F 16/86; G06F 16/2453; G06F 16/3332; G06F 16/30; G06F 16/80
See application file for complete search history.

(56) References Cited

U.S. PATENT DOCUMENTS 6,092,061 A * 7/2000 Choy ................. G06F 16/2282
6,421,687 B1 * 7/2002 Klostermann ...... G06F 16/2471
(Continued)

FOREIGN PATENT DOCUMENTS

CN    102834802 A    12/2012
CN    104750809 A    7/2015
(Continued)

OTHER PUBLICATIONS

Mary Lovelace, Jose Dovidauskas, Alvaro Salla, Valeria Sokal, VSAM Demystified, Mar. 2013, IBM Redbooks, Third Edition, pp. 15-17, 19-20 (Year: 2013).*

(Continued)

*Primary Examiner* — Marc S Somers
(74) *Attorney, Agent, or Firm* — Zilka Kotab, P.C.

(57) ABSTRACT

In one embodiment, a method includes receiving an unstructured data record and parsing the unstructured data record to determine a characterization of the unstructured data record. The characterization includes determination of: a number of fields, a length for the fields, and an order of the fields as stored in the unstructured data record. The method also includes obtaining a first key pair that includes a primary key-name associated with a first key-value and hashing at least the first key-value to obtain a hash value. In addition, the method includes updating the unstructured data record to include the hash value as an indexing key thereby creating a modified data record. Also, the method includes storing the modified data record in a structured database. Moreover, the method includes updating an index of the structured database to include an entry for the modified data record, the entry including the hash value.

25 Claims, 8 Drawing Sheets

(51) Int. Cl.
  *G06F 16/33*   (2019.01)
  *G06F 16/3332*  (2025.01)
  *G06F 16/81*   (2019.01)
  *G06F 16/84*   (2019.01)

(56) References Cited

U.S. PATENT DOCUMENTS

| | | | | |
|---|---|---|---|---|
| 7,313,657 | B1* | 12/2007 | Katzer | G06F 16/273 |
| | | | | 711/151 |
| 8,620,884 | B2* | 12/2013 | Calder | G06F 16/2255 |
| | | | | 707/696 |
| 8,825,605 | B2* | 9/2014 | Nayak | G06F 3/0613 |
| | | | | 707/662 |
| 9,471,711 | B2* | 10/2016 | Abadi | G06F 16/90335 |
| 2004/0221295 | A1* | 11/2004 | Kawai | H04L 51/42 |
| | | | | 719/313 |
| 2005/0289446 | A1* | 12/2005 | Moncsko | G06F 16/9558 |
| | | | | 715/208 |
| 2009/0144220 | A1* | 6/2009 | Feng | G06F 16/2255 |
| 2009/0196423 | A1* | 8/2009 | Chandrasekaran | |
| | | | | G06F 16/2358 |
| | | | | 380/277 |
| 2009/0287986 | A1* | 11/2009 | Vishniac | G06F 16/10 |
| | | | | 714/819 |
| 2012/0047169 | A1* | 2/2012 | Schroeder | G06F 16/273 |
| | | | | 707/E17.014 |
| 2013/0138646 | A1* | 5/2013 | Sirer | G06F 16/2471 |
| | | | | 707/736 |
| 2013/0232157 | A1 | 9/2013 | Kamel | |
| 2013/0265883 | A1* | 10/2013 | Henry | H04L 43/028 |
| | | | | 370/241 |
| 2015/0088924 | A1 | 3/2015 | Abadi et al. | |
| 2017/0091327 | A1* | 3/2017 | Bostic | G06F 16/252 |
| 2017/0147541 | A1 | 5/2017 | Lashley et al. | |
| 2017/0193041 | A1 | 7/2017 | Fuchs | |
| 2017/0235845 | A1* | 8/2017 | Long | G06F 16/81 |
| | | | | 707/741 |
| 2017/0270153 | A1* | 9/2017 | Bantupalli | G06F 16/27 |
| 2017/0308621 | A1* | 10/2017 | Wu | G06F 16/24575 |
| 2018/0089188 | A1* | 3/2018 | Kharisma | G06F 3/0481 |
| 2018/0293280 | A1* | 10/2018 | Svec | G06F 16/2477 |

FOREIGN PATENT DOCUMENTS

| | | |
|---|---|---|
| CN | 105608224 A | 5/2016 |
| CN | 105677826 A | 6/2016 |
| CN | 106776783 A | 5/2017 |
| JP | 2000250927 A | 9/2000 |

OTHER PUBLICATIONS

Anonymous, "Automatic Transformation of Unstructured and Semi-structured Document Tables to Structured Relational Database Format," ip.com, No. IPCOM000245463D, Mar. 11, 2016, pp. 1-8.

Anonymous, "A method of converting the unstructured data stream into structured," ip.com, No. IPCOM000224164D, Dec. 12, 2012, pp. 1-12.

Anonymous, "Technique for Enabling Authorization of Unstructured Data," ip.com, No. IPCOM000233146D, Nov. 26, 2013, pp. 1-11.

Uskenbayeva, "Multidimensional indexing structure development for the optimal formation of aggregated indicators in OLAP hypercube," 2014 14th International Conference on Control, Automation and Systems (ICCAS 2014), Oct. 22-25, 2014, pp. 1466-1470.

International Search Report and Written Opinion from PCT Application No. PCT/IB2018/059651, dated Mar. 27, 2019.

Examination Report from European Application No. GB2010394.1, dated Aug. 6, 2020.

Notice of Reasons for Rejection Translation from Japanese Application No. 2020-531721, dated Apr. 19, 2022.

Office Action from Chinese Patent Application No. 201880075618.0, dated Apr. 11, 2023.

* cited by examiner

STORING UNSTRUCTURED DATA IN A STRUCTURED FRAMEWORK

BACKGROUND

The present invention relates to storing unstructured data, and more particularly, to storing unstructured document-oriented non-relational data in an architecture which utilizes a structured framework.

Vast amounts of data are being produced by many thousands of devices and systems that are ever increasingly being added to networks, larger systems, groups, and existing communications channels, via hardwired and wireless connection technologies. The increase in popularity of "smart" devices and Internet-of-Things (IoT) devices has caused an increase in the amount of data that is available to be analyzed, stored, and managed. Many different types of devices now exist that produce a wealth of information, such as smartwatches, smart refrigerators and other appliances, automobiles, mobile phones, tablets and notebooks, bio-trackers (like fitness bands, heart rate monitors, running watches, etc.), medical devices, medical diagnostics devices, etc. Typically, a large portion of this data being produced by these devices is unstructured data.

Document-oriented non-relational databases, such as the popular MongoDB® and CouchDB®, hold and process unstructured data, such as non-structured query language (NoSQL) databases. These databases assume that documents encapsulate and encode data in one of several standard formats, such as JavaScript Object Notation (JSON) or Binary JSON (BSON). In a document-oriented database, a "record" is commonly referred to as a "document," and both are used interchangeably in the following descriptions. These databases use modern paradigms for data storage and allow for rapid deployment of such databases. These attributes are made possible because a database schema is not required, and any object within the non-relational database can be defined with any set of parameters. However, to currently store a set of unstructured data, typically the data is saved in a continuous stream of bytes. In order to search through all the data for a specific document for any particular aspect of the document, large amounts of data must be read from the database sequentially, which is time and resource intensive. Moreover, storing data in this way to non-relational databases does not allow for full advantage of advanced access methods for storing and retrieving data and data management techniques to be utilized which are available with structured databases.

In addition, attempts to store unstructured data to a structured database which rely on storing the unstructured data as a continuous data stream or file do not allow for indexing of the data once stored to the structured database. Attempts to store unstructured data to a structured database which rely on creation of additional indexes on top of or separate from the primary index of the structured database require additional overhead when storing the data, and an unnecessary delay when attempting to search for specific documents within the database.

SUMMARY

In one embodiment, a method includes receiving an unstructured data record and parsing the unstructured data record to determine a characterization of the unstructured data record. The characterization includes determination of: a total length of the unstructured data record, a number of fields, a length for the fields, and an order of the fields as stored in the unstructured data record. The method also includes obtaining a first key pair that includes a primary key-name associated with a first key-value and hashing at least the first key-value to obtain a hash value. In addition, the method includes updating the unstructured data record to include the hash value as an indexing key thereby creating a modified data record. Also, the method includes storing the modified data record in a structured database. Moreover, the method includes updating an index of the structured database to include an entry for the modified data record, the entry including the hash value.

In another embodiment, a computer program product includes a computer readable storage medium having program instructions embodied therewith. The computer readable storage medium is not a transitory signal per se, and the embodied program instructions are executable by a processing circuit to cause the processing circuit to receive, by the processing circuit, an unstructured data record and parse, by the processing circuit, the unstructured data record to determine a characterization of the unstructured data record. The characterization includes determination of: a total length of the unstructured data record, a number of fields, a length for the fields, and an order of the fields as stored in the unstructured data record. The embodied program instructions also cause the processing circuit to obtain, by the processing circuit, a first key pair that includes a primary key-name associated with a first key-value. In addition, the embodied program instructions cause the processing circuit to hash, by the processing circuit, at least the first key-value to obtain a hash value and update, by the processing circuit, the unstructured data record to include the hash value as an indexing key thereby creating a modified data record. Additionally, the embodied program instructions cause the processing circuit to store, by the processing circuit, the modified data record in a structured database. Moreover, the embodied program instructions cause the processing circuit to update, by the processing circuit, an index of the structured database to include an entry for the modified data record, the entry including the hash value.

In yet another embodiment, a system includes a processing circuit, a memory, and logic stored to the memory, that when executed by the processing circuit causes the processing circuit to receive an unstructured data record. The logic also causes the processing circuit to parse the unstructured data record to determine a characterization of the unstructured data record. The characterization includes determination of: a total length of the unstructured data record, a number of fields, a length for the fields, and an order of the fields as stored in the unstructured data record. Also, the logic causes the processing circuit to obtain a first key pair that includes a primary key-name associated with a first key-value and hash at least the first key-value to obtain a hash value. In addition, the logic causes the processing circuit to update the unstructured data record to include the hash value thereby creating a modified data record. Additionally, the logic causes the processing circuit to store the modified data record in a structured database. Moreover, the logic causes the processing circuit to update an index of the structured database to include an entry for the modified data record, the entry including the hash value.

In accordance with another embodiment, a method includes receiving an unstructured data record that adheres to JavaScript Object Notation (JSON) or binary JavaScript Object Notation (BSON). The method also includes parsing the data record to determine a total length of the unstructured data record, a number of fields, a length for the fields, and an order of the fields as stored in the data record. The method also includes receiving or generating a primary key-name and associating the primary key-name with a set of data records that includes the data record. Also, the method includes generating a primary key-value that is associated with the data record by incrementing an integer value by one and selecting a resulting value and hashing the primary key-value to obtain a hash value. In addition, the method includes updating the data record to create a modified data record by adding the primary key-name:key-value pair and the hash value as an indexing key. The method also includes storing the modified data record in a Virtual Storage Access Method (VSAM) database. Moreover, the method includes updating a Key-Sequenced Data Set (KSDS) VSAM database index to include an entry for the modified data record, the entry including the hash value.

According to yet another embodiment, a method includes receiving an unstructured database that includes a plurality of unstructured data records therein. The method also includes parsing at least one data record of the plurality of unstructured data records to determine a number of fields in the at least one data record, a total length of the at least one record, a length for the fields of the at least one data record, and an order of the fields as stored in the at least one data record. The method additionally includes receiving or generating a primary key-name and associating the primary key-name with the plurality of unstructured data records. Also, the method includes generating a plurality of key-values, each key-value being associated with one data record of the plurality of unstructured data records by selecting a unique integer value as a key-value individually for each data record of the plurality of unstructured data records. In addition, the method includes hashing a primary key-value for each data record of the plurality of unstructured data records to obtain a plurality of hash values. Additionally, the method includes updating each data record of the plurality of unstructured data records by adding the primary key-name: key-value pair and a hash value specific to each modified data record individually to create a plurality of modified data records. The method also includes storing the plurality of modified data records in a structured or semi-structured database. Moreover, the method includes updating a primary index of the structured or semi-structured database to include entries for all of the modified data records, each entry including one of the plurality of hash values.

Some benefits of these embodiments include faster access speed to the unstructured data after being stored to the structured framework, and enhanced searchability via the primary index (and any alternate indexes created based on the unstructured data). Moreover, an entire data set (which may include a plurality of data records therein) does not get rewritten when updating one or more data records therein, in contrast to unstructured data that is stored in data sets as a stream-of-bytes, which relies on the entire data set being rewritten to update any of the data records therein. Unstructured data that is stored to the structured framework according to the present embodiment may be updated at a document or record level, reducing the overall amount of I/O that is utilized in the update process and increasing performance of the structured database in association with processing the unstructured data records stored therein.

Other aspects and embodiments of the present invention will become apparent from the following detailed description, which, when taken in conjunction with the drawings, illustrate by way of example the principles of the invention.

DETAILED DESCRIPTION

Figure 1:
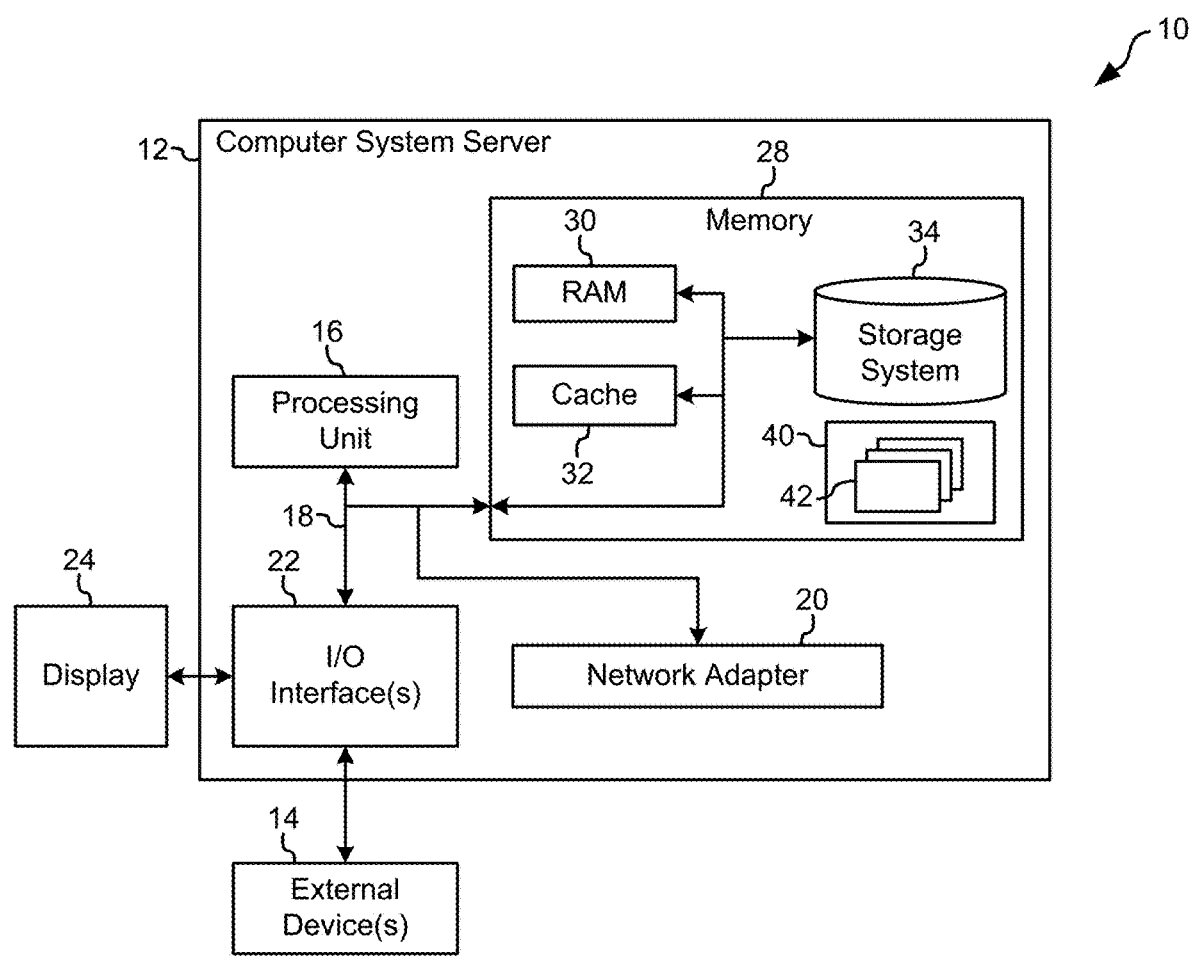
FIG. 1 depicts a computing node according to an embodiment of the invention.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The term "about" as used herein indicates the value preceded by the term "about," along with any values reasonably close to the value preceded by the term "about," as would be understood by one of skill in the art. When not indicated otherwise, the term "about" denotes the value preceded by the term "about"±10% of the value. For example, "about 10" indicates all values from and including 9.0 to 11.0.

The following description discloses several preferred embodiments of systems, methods, and computer program products for storing unstructured data in an architecture which utilizes a structured framework.

In one general embodiment, a method includes receiving an unstructured data record and parsing the unstructured data record to determine a characterization of the unstructured data record. The characterization includes determination of: a total length of the unstructured data record, a number of fields, a length for the fields, and an order of the fields as stored in the unstructured data record. The method also includes obtaining a first key pair that includes a primary key-name associated with a first key-value and hashing at least the first key-value to obtain a hash value. In addition, the method includes updating the unstructured data record to include the hash value as an indexing key thereby creating a modified data record. Also, the method includes storing the modified data record in a structured database. Moreover, the method includes updating an index of the structured database to include an entry for the modified data record, the entry including the hash value.

In another general embodiment, a computer program product includes a computer readable storage medium having program instructions embodied therewith. The computer readable storage medium is not a transitory signal per se, and the embodied program instructions are executable by a processing circuit to cause the processing circuit to receive, by the processing circuit, an unstructured data record and parse, by the processing circuit, the unstructured data record to determine a characterization of the unstructured data record. The characterization includes determination of: a total length of the unstructured data record, a number of fields, a length for the fields, and an order of the fields as stored in the unstructured data record. The embodied program instructions also cause the processing circuit to obtain, by the processing circuit, a first key pair that includes a primary key-name associated with a first key-value. In addition, the embodied program instructions cause the processing circuit to hash, by the processing circuit, at least the first key-value to obtain a hash value and update, by the processing circuit, the unstructured data record to include the hash value as an indexing key thereby creating a modified data record. Additionally, the embodied program instructions cause the processing circuit to store, by the processing circuit, the modified data record in a structured database. Moreover, the embodied program instructions cause the processing circuit to update, by the processing circuit, an index of the structured database to include an entry for the modified data record, the entry including the hash value.

In yet another general embodiment, a system includes a processing circuit, a memory, and logic stored to the memory, that when executed by the processing circuit causes the processing circuit to receive an unstructured data record. The logic also causes the processing circuit to parse the unstructured data record to determine a characterization of the unstructured data record. The characterization includes determination of: a total length of the unstructured data record, a number of fields, a length for the fields, and an order of the fields as stored in the unstructured data record. Also, the logic causes the processing circuit to obtain a first key pair that includes a primary key-name associated with a first key-value and hash at least the first key-value to obtain a hash value. In addition, the logic causes the processing circuit to update the unstructured data record to include the hash value thereby creating a modified data record. Additionally, the logic causes the processing circuit to store the modified data record in a structured database. Moreover, the logic causes the processing circuit to update an index of the structured database to include an entry for the modified data record, the entry including the hash value.

In accordance with another general embodiment, a method includes receiving an unstructured data record that adheres to JavaScript Object Notation (JSON) or binary JavaScript Object Notation (BSON). The method also includes parsing the data record to determine a total length of the unstructured data record, a number of fields, a length for the fields, and an order of the fields as stored in the data record. The method also includes receiving or generating a primary key-name and associating the primary key-name with a set of data records that includes the data record. Also, the method includes generating a primary key-value that is associated with the data record by incrementing an integer value by one and selecting a resulting value and hashing the primary key-value to obtain a hash value. In addition, the method includes updating the data record to create a modified data record by adding the primary key-name:key-value pair and the hash value as an indexing key. The method also includes storing the modified data record in a Virtual Storage Access Method (VSAM) database. Moreover, the method includes updating a Key-Sequenced Data Set (KSDS) VSAM database index to include an entry for the modified data record, the entry including the hash value.

According to yet another general embodiment, a method includes receiving an unstructured database that includes a plurality of unstructured data records therein. The method also includes parsing at least one data record of the plurality of unstructured data records to determine a number of fields in the at least one data record, a total length of the at least one data record, a length for the fields of the at least one data record, and an order of the fields as stored in the at least one data record. The method additionally includes generating a primary key-name and associating the primary key-name with the plurality of unstructured data records. Also, the method includes receiving or generating a plurality of key-values, each key-value being associated with one data record of the plurality of unstructured data records by selecting a unique integer value as a key-value individually for each data record of the plurality of unstructured data records. In addition, the method includes hashing a primary key-value for each data record of the plurality of unstructured data records to obtain a plurality of hash values. Additionally, the method includes updating each data record of the plurality of unstructured data records by adding the primary key-name: key-value pair and a hash value specific to each modified data record individually to create a plurality of modified data records. The method also includes storing the plurality of modified data records in a structured or semi-structured database. Moreover, the method includes updating a primary index of the structured or semi-structured database to include entries for all of the modified data records, each entry including one of the plurality of hash values.

Referring to FIG. 1, a schematic of an example of a computing node 10 is shown in accordance with one embodiment. The computing node 10 is only one example of a suitable computing node and is not intended to suggest any limitation as to the scope of use or functionality of embodiments of the invention described herein. Regardless, computing node 10 is capable of being implemented and/or performing any of the functionality set forth herein. Moreover, computing node 10 may be included in any system, network, cloud, cluster, and/or data storage environment as described herein and/or known to those of skill in the art.

In the computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held devices, laptop devices, multiprocessor systems, microprocessor-based systems, set top boxes, programmable consumer electronics, network personal computers (PCs), minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in the computing node 10 is shown in the form of a general-purpose computing device. The components of computer system/server 12 may include, but are not limited to, one or more processors, processing circuits, and/or processing units (collectively, processor 16), a system memory 28, and a bus 18 that couples various system components including system memory 28 to the processor 16.

Bus 18 represents one or more of any of several types of bus structures, including a memory bus, a memory controller, a peripheral bus, an accelerated graphics port, a processor, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer readable storage media. Such media may be any available media that is accessible by computer system/server 12, and it includes both volatile and non-volatile media, removable and non-removable media, etc.

System memory 28 may include computer readable storage media in the form of volatile memory, such as random access memory (RAM) 30 and/or cache memory 32. Computer system/server 12 may further include other removable/non-removable, volatile/non-volatile computer readable storage media. By way of example only, storage system 34 may be provided for reading from and writing to a non-removable, non-volatile magnetic storage media (not shown and typically called a "hard drive" or "solid state drive"). Although not shown, a magnetic disk drive for reading from and writing to a removable, non-volatile magnetic disk (e.g., a "floppy disk"), and an optical disk drive for reading from and/or writing to a removable, non-volatile optical disk such as a CD-ROM, DVD-ROM, and/or other optical media may be provided. In such instances, each may be connected to the bus 18 by one or more data media interfaces. As will be further depicted and described below, memory 28 may include at least one computer program product having a set (e.g., at least one) of program modules that are configured to carry out the functions described in embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication may occur via Input/Output (I/O) interfaces 22. Still yet, computer system/server 12 may communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, redundant array of independent disks (RAID) systems, tape drives, data archival storage systems, etc.

The computer system/server 12 may have resident thereon an operating system such as the Microsoft Windows® Operating System (OS), an Apple® OS, a UNIX OS, IBM® z/OS, etc. It will be appreciated that a preferred embodiment may also be implemented on platforms and operating systems other than those mentioned. A preferred embodiment may be written using PL/I, XML, C, and/or C++ language, or other programming languages, along with an object oriented programming methodology. Object oriented programming (OOP), which has become increasingly used to develop complex applications, may be used.

Figure 2:
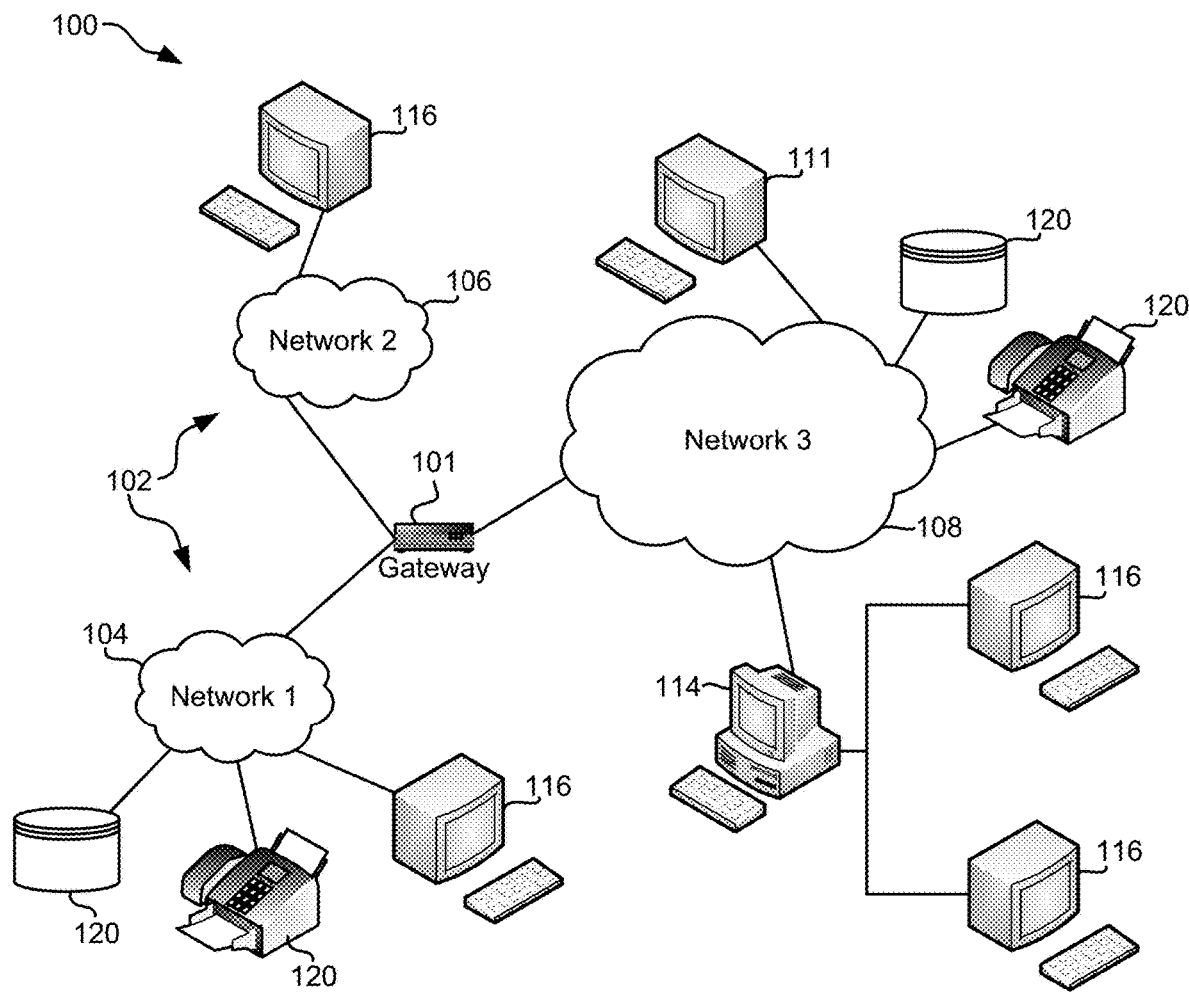
FIG. 2 illustrates a network architecture, in accordance with one embodiment.

FIG. 2 illustrates an architecture 100, in accordance with one embodiment. Computing node 10 shown in FIG. 1 may be utilized in the architecture 100 as shown in FIG. 2. Moreover, the architecture 100 may include a plurality of remote networks 102 including a first remote network 104 and a second remote network 106. A gateway 101 may be coupled between the remote networks 102 and a proximate network 108. In the context of the present architecture 100, the networks 104, 106 may each take any form including, but not limited to, a LAN, a WAN such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. User devices 116 may also be connected directly through one of the networks 104, 106, 108. Such user devices 116 may include a desktop computer, laptop computer, hand-held computer, printer, and/or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software or some other known virtualization layer, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 3:
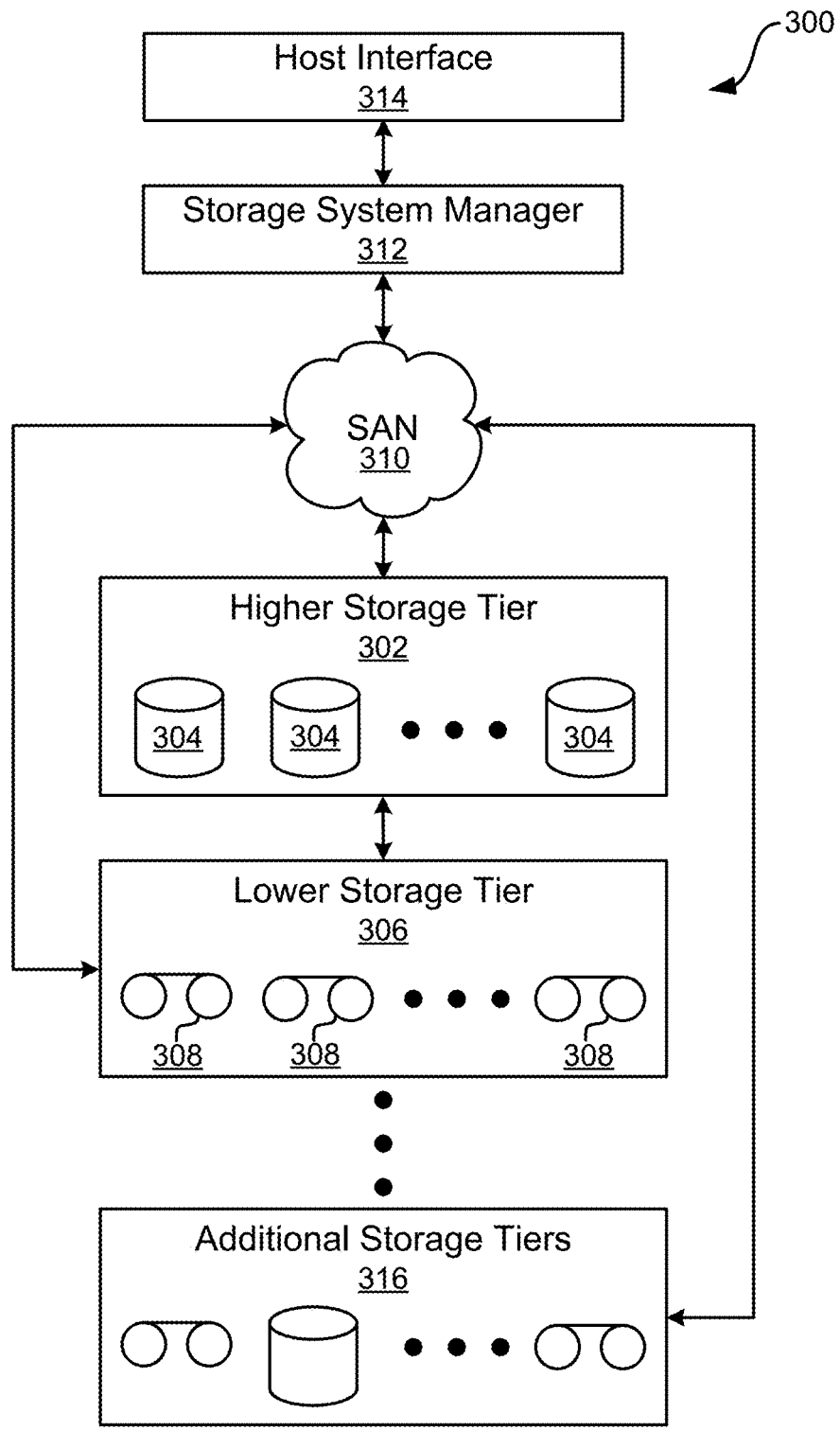
FIG. 3 illustrates a tiered data storage system in accordance with one embodiment.

Now referring to FIG. 3, a tiered storage system 300 is shown according to one embodiment. Note that some of the elements shown in FIG. 3 may be implemented as hardware and/or software, according to various embodiments. The storage system 300 may include a storage system manager 312 for communicating with a plurality of media on at least one higher storage tier 302 and at least one lower storage tier 306. The storage system manager may also include a job control manager for managing job requests, as described in more detail herein according to various embodiments. The higher storage tier(s) 302 preferably may include one or more random access and/or direct access media 304, such as nonvolatile memory (NVM), solid state memory in solid state drives (SSDs), flash memory, SSD arrays, flash memory arrays, hard disks in hard disk drives (HDDs), etc., and/or others noted herein or known in the art. The lower storage tier(s) 306 may preferably include one or more lower performing storage media 308, including slower accessing HDDs, sequential access media such as magnetic tape in tape drives and/or optical media, etc., and/or others noted herein or known in the art. One or more additional storage tiers 316 may include any combination of storage memory media as desired by a designer of the system 300. Also, any of the higher storage tiers 302 and/or the lower storage tiers 306 may include some combination of storage devices and/or storage media.

The storage system manager 312 may communicate with the storage media 304, 308 on the higher storage tier(s) 302 and lower storage tier(s) 306 through a network 310, such as a storage area network (SAN), as shown in FIG. 2, or some other suitable network type. The storage system manager 312 may also communicate with one or more host systems (not shown) through a host interface 314, which may or may not be a part of the storage system manager 312. The storage system manager 312 and/or any other component of the storage system 300 may be implemented in hardware and/or software, and may make use of a processor (not shown) of a type known in the art, such as a central processing unit (CPU), a field programmable gate array (FPGA), an application specific integrated circuit (ASIC), etc., for executing commands. Of course, any arrangement of a storage system may be used, as will be apparent to those of skill in the art upon reading the present description.

In more embodiments, the storage system 300 may include any number of data storage tiers, and may include the same or different storage memory media within each storage tier. For example, each data storage tier may include the same type of storage memory media, such as HDDs, SSDs, sequential access media (tape in tape drives, optical disk in optical disk drives, etc.), direct access media (CD-ROM, DVD-ROM, etc.), or any combination of media storage types. In one such configuration, a higher storage tier 302, may include a majority of SSD storage media (up to and including all SSD storage media) for storing data in a higher performing storage environment, and remaining storage tiers, including lower storage tier 306 and additional storage tiers 316 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 302, while data not having one of these attributes may be stored to the additional storage tiers 316, including lower storage tier 306. Of course, one of skill in the art, upon reading the present descriptions, may devise many other combinations of storage media types to implement into different storage schemes, according to the embodiments presented herein.

In one particular embodiment, the storage system 300 may include a combination of SSDs and HDDs, with the higher storage tier 302 including SSDs (and possibly some buffer memory) and the lower storage tier 306 including HDDs (and possibly some buffer memory). According to another embodiment, the storage system 300 may include a combination of SSDs and magnetic tape with magnetic tape drives, with the higher storage tier 302 including SSDs (and possibly some buffer memory) and the lower storage tier 306 including magnetic tape (and possibly some buffer memory) and magnetic tape drives for accessing data from the magnetic tapes. In yet another embodiment, the storage system 300 may include a combination of HDDs and magnetic tape, with the higher storage tier 302 including HDDs (and possibly some buffer memory) and the lower storage tier 306 including magnetic tape (and possibly some buffer memory).

Figure 4:
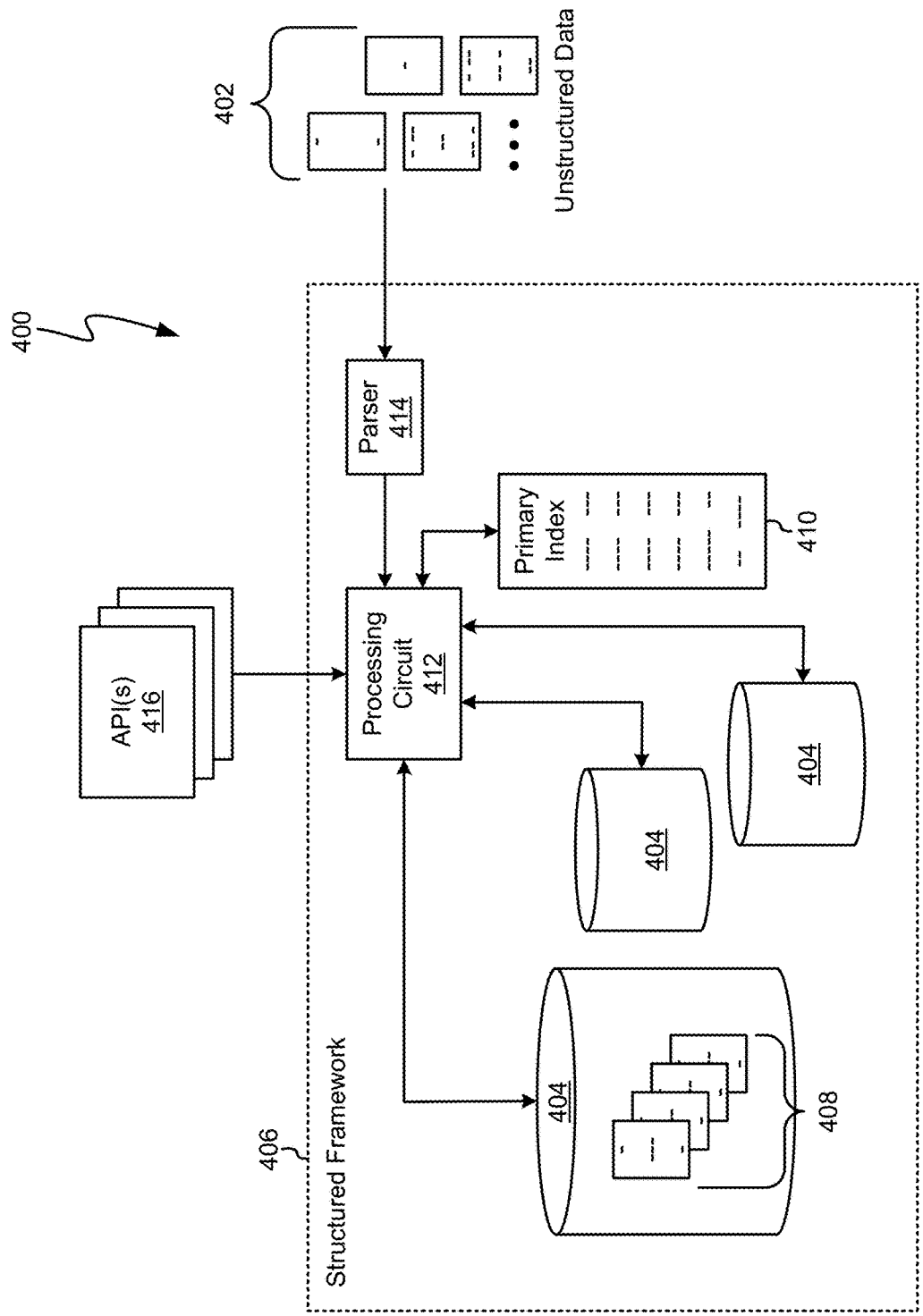
FIG. 4 shows a system for storing unstructured data in a structured framework, according to one embodiment.

With reference to FIG. 4, a system 400 is shown according to one embodiment. The system 400 includes a processing circuit 412, logic that causes the processing circuit to perform certain data management functionality that is described herein in various embodiments, and one or more computer readable storage media 404. With this system 400, unstructured data 402 may be stored in a structured framework 406 on the one or more computer readable storage media 404. By unstructured data 402, what is meant is that each data record includes information that does not have a predefined data model, is not organized in a predefined manner, is not stored in accordance with a predefined data format, etc. The unstructured data 402 may be stored in accordance with any known unstructured format or semi-structured format prior to being stored on the one or more computer readable storage media 404 of the structured framework 406. Some exemplary unstructured or semi-structured formats include, but are not limited to, JavaScript Object Notation (JSON) data format, Binary JSON (BSON) data format, MessagePack™, YAML, Extensible Mark-up Language (XML), or some other suitable unstructured or semi-structured data format. Moreover, in some approaches, this unstructured data 402 may be stored to a non-relational NoSQL database, such as MongoDB®, ArangoDB™, etc., prior to storage in the structured framework 406. This type of data is difficult to work with because it is unknown what fields exist in the data, the length of fields, an order of the fields, etc., and this information is useful in ascertaining what is included in each of the unstructured data records of the unstructured data 402.

Structured data, as used herein, refers to information with a high degree of organization, which allows for rapid and seamless addition to a relational (or structured) database and is readily searchable by simple, straightforward search engine algorithms or other search operations. A structured framework 406, as used herein, indicates a framework or architecture that is configured to store data in a relational manner or construct on the one or more computer readable storage media 404. A structured framework 406 may be fully structured, indicating that each data record has a predefined format, such as IBM® DB2®, Microsoft® SQL Server, Oracle® Database, etc., or semi-structured, indicating that data records therein may be customized or altered from a pre-set format under specified guidelines, such as IBM® Virtual Storage Access Method (VSAM), which may or may not allow for access to data records via Record Level Sharing (RLS).

In a structured framework 406, the stored data 408 (structured data and, when stored in accordance with embodiments described herein, modified versions of the unstructured data 402) on the one or more computer readable storage media 404 may be rapidly accessed via a primary index 410, such as a Key-Sequenced Data Set (KSDS) of a VSAM-based database, or other indexing mechanisms of structured or semi-structured architectures known in the art. In this way, the benefits of structured data and a structured framework 406, including faster access speed and enhanced searchability, may be provided to unstructured data 402 stored therein.

Another benefit of storing unstructured data 402 in accordance with this embodiment is that an entire data set, as stored in the structured framework 406, is not rewritten, as with traditional stream-of-bytes data sets, in response to updates to the stored data 408 being requested and processed. With a data set stored as structured data, the stored data 408 may be updated at a document level, reducing the overall amount of I/O and increasing performance associated with usage of the data within the structured framework 406.

This is an improvement over other methods of storing unstructured data in a structured framework that utilizes a continuous data stream or file to store the unstructured data, or methods that create additional indexes on top of or separate from the structured database and index(es) thereof, as these methods create additional overhead and/or delays when attempting to search for specific documents within the database.

In one embodiment, the unstructured data 402 is stored in a structured framework 406, such as a structured or semi-structured database, by taking the unstructured data 402 or document, parsing the unstructured data 402 or document using a parser 414 to determine a characterization of the data, generating a primary key for indexing the data, possibly adding metadata to the primary key in some implementations, modifying the unstructured data 402 or document to include the primary key (and metadata in some implementations), storing the modified data or document to the structured framework 406, and providing one or more application programming interfaces (APIs) 416 that allow access to certain basic database management commands, such as GET, PUT, and ERASE, based on a "key-name:key-value" pair relationship search of the primary index 410. In this embodiment, a consistent primary key-name is used for the unstructured data 402 or document, which is received, discovered, or generated for each set of unstructured data (e.g., a document, data record, etc.).

In accordance with this embodiment, the primary key-value in a primary key-name and key-value pair ("key-name:key-value") is hashed using one of a plurality of well-known hashing algorithms widely available to one of skill in the art, and the resulting hash value is used as a key for indexing in the primary index 410 suitable for the particular database management protocol being used, such as a KSDS used within VSAM, or some other suitable index and management protocol. This primary key provides rapid access to any document via the key pair, which includes the primary key-name associated with the key-value, e.g., a primary "key-name:key-value" pair.

Moreover, in one embodiment, secondary or alternate indexes may be created in addition to the primary index 410 which allow for alternate ways to reference the unstructured data 402 or document within the structured framework 406.

Some benefits of using these techniques of storing unstructured data within a structured framework include, but are not limited to, faster look-up speed when referencing a particular document using the primary key-name:key-value pair. The faster look-up speed is possible in comparison to basic implementations of an unstructured database which would re-read every record in the unstructured database to find the record(s) that match a given key-name:key-value pair. Using a structured or semi-structured indexing scheme, such as VSAM, a desired record may be found in the database significantly faster.

In addition, benefits include advanced serialization that includes the ability to lock at the record or document level, which provides higher throughput compared to locking the entire data set. Also, benefits include buffering on only those documents or records which are referenced most recently and updating individual documents or records without requiring a re-write or retrieval of large portions of the data set. This lowers the amount of buffer utilized in database activities and provides higher throughput when updating documents or records.

Figure 5:
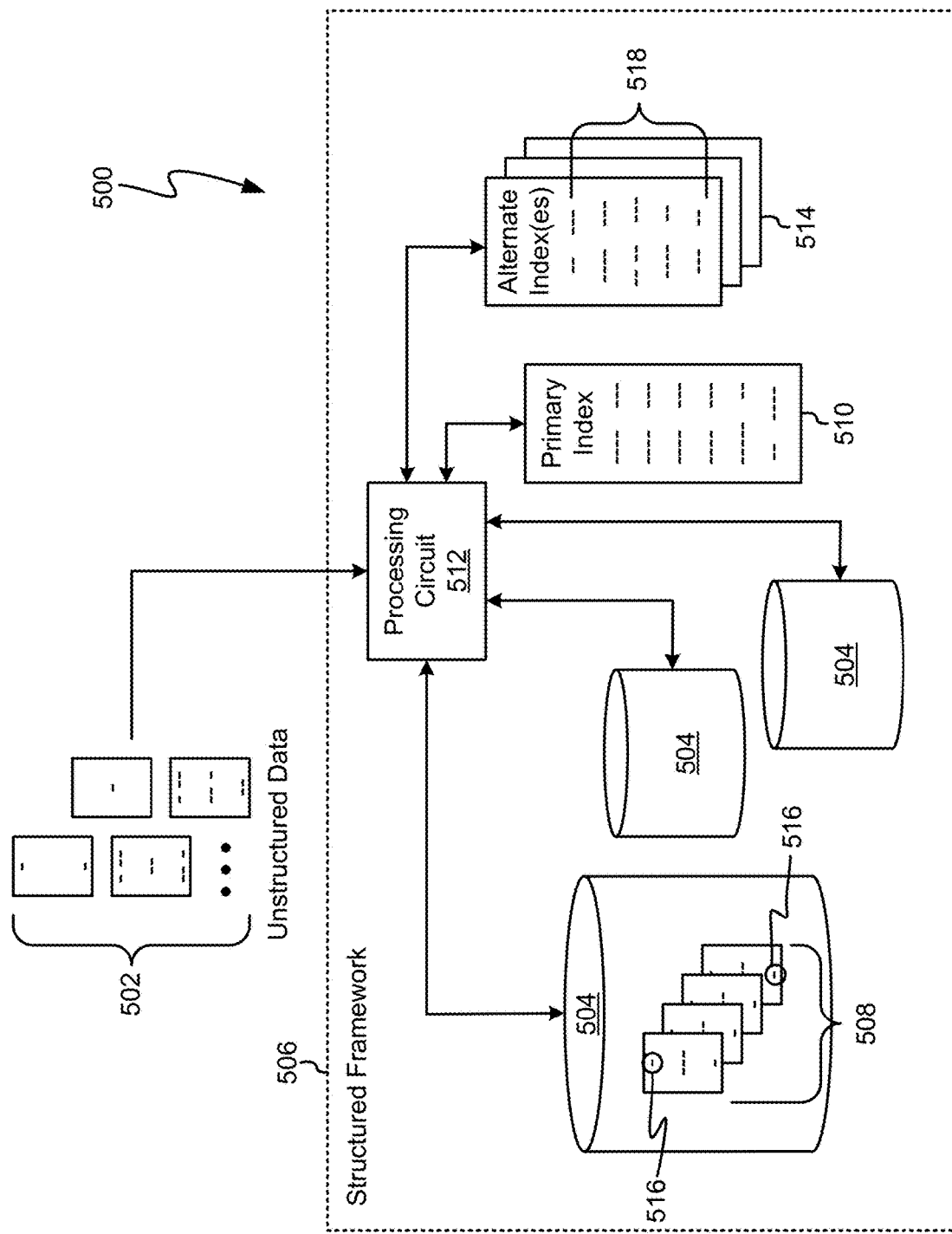
FIG. 5 shows a system that provides the ability for secondary indexes to be created for a structured database.

Now referring to FIG. 5, a system 500 that provides the ability for certain keys 516 within one or more data records to be specified (such as by a user, administrator, or some other suitable person or process) that automatically cause creation of secondary indexes 514. These secondary or alternate indexes (AIX) 514 include a record of the possible values for a key-name:key-value and a hashed key 518 associated therewith which may also be used to locate the stored data 508 or document in the structured framework 506 that originated as an unstructured data 502 or document. The system 500 includes a processing circuit 512, logic that causes the processing circuit 512 to perform certain data management functionality that is described herein in various embodiments, and one or more computer readable storage media 504.

According to one embodiment, a format that may be used for the entries inside the AIX 514 includes: <metadata><# of base pointers><AIX version><AIX flags><AIX key length><AIX key-value><base key 1><base key 2><base key 3> . . . .

In this embodiment, the "AIX key" is a value internal to the alternate index that is able to differentiate any particular AIX entry 518 from other AIX entries 518. The "metadata" includes information about the unstructured data 502 or document, such as version number, document length, date created or modified, etc. The "key length" indicates a set length of the alternate key-value, and the "AIX key-value" is the value from the key-name:key-value pair. Each "base key" in an AIX record is a hashed key-value specific to one particular unstructured data 502 or document and may be used to reference the stored base data 508 or document through the primary index 510. Each base document that has that base key-value will have an entry in the base key list of the alternate index 514.

In response to a request being received to look up a certain key-value associated with a particular key-name for which an AIX 514 has been created, the AIX 514 will be searched to find an entry that describes that certain key-value. The base keys that are listed in the entry will then be utilized to perform a look up via the primary index 510, thereby providing access to the desired document.

For example, assume that three documents are located inside a JSON-based database:

{"id":"0003", "name":"Patty", "last":"Johnson" }
{"id":"0002", "name":"Jane", "last":"Smith" }
{"id":"0001", "name":"John", "last":"Smith" }

The primary index in this example may be built from the primary key-name of "id" and may be constructed such that each document is stored inside the VSAM KSDS with a VSAM key built from the hashed value. In this example, a simplified representation of the primary index, solely for explanation purposes, may appear as follows:

8820 {"id":"0003", "name":"Patty", "last":"Johnson" }
9G56 {"id":"0002", "name":"Jane", "last":"Smith" }
A001 {"id":"0001", "name":"John", "last":"Smith" }

In this example of a primary index, 9G56, A001, and 8820 are the hashed primary values derived from the "id" values 0001, 0002, 0003. These hashed values are ordered in sequence by the VSAM keys within the data base, thereby rearranging the ordering from that of the three original documents. Given this structure, an alternate index built on key-name: "last" would appear as follows (again simplified):

Metadata 0001 01 00 07 Johnson 8820
Metadata 0002 01 00 05 Smith 9G56 A001

In this example of an AIX, 0001 and 0002 are the number of base keys in each list, 01 is an indicator of the version, 00 is an indicator of one or more flags (which are customizable, and not present in all embodiments), and 07 and 05 are the lengths of the key-value, "Johnson" and "Smith", respectively.

In this example of the AIX, Johnson is paired to base key 8820 which is Patty Johnson from the primary index. Also, Smith has two entries, 9G56 and A001, each of which points to a document with key-name "last" having the value of "Smith", but being different documents.

In one particular implementation, the key-value may be truncated at a truncation threshold, e.g., 252 bytes in one example, or more or less in other embodiments, such as 128 bytes, 514 bytes, etc. If the length of the key-value exceeds the pre-set truncation threshold, e.g., more than 252 bytes in length in this example, only the first amount of bytes up to the pre-set truncation threshold are stored and used for searching, e.g., the first 252 bytes of the key-value in this example. Additionally, the hashed primary VSAM keys may also be limited in length, such as 128 bytes in length in one example, or more or less in other embodiments, such as 64 bytes, 256 bytes, etc.

The alternate indexes may be built "on the fly" and/or on demand via a user-started process, or automatically, which scan all of the documents or records of the database and extract relevant information with which to build the index.

Moreover, in one approach, the alternate indexes may be updated during standard database management operations, such as during INSERT, UPDATE, and ERASE activity, by scanning the new document and updating affected alternate indexes according to any new or modified information in the new document.

Figure 6:
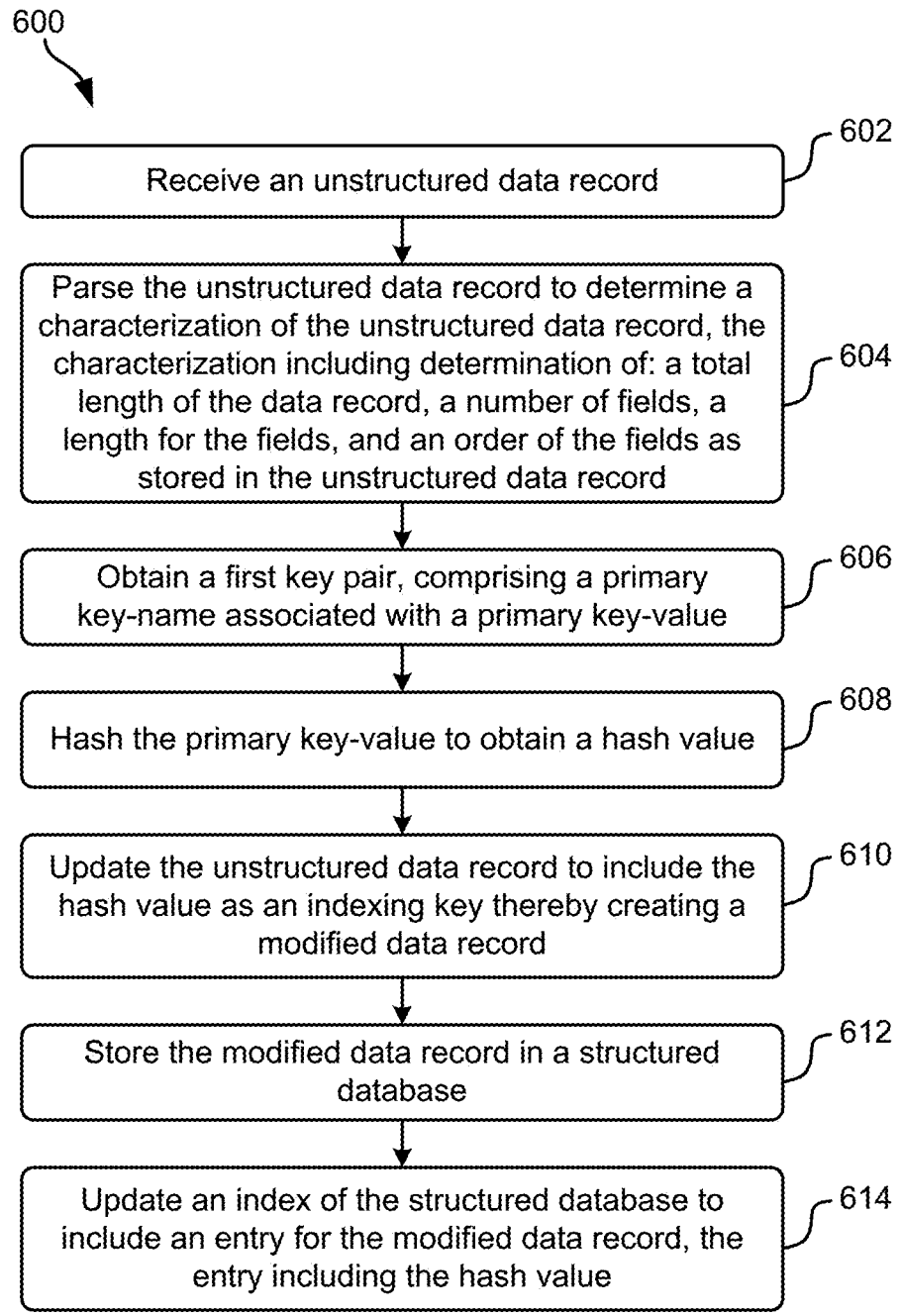
FIG. 6 shows a flowchart of a method, according to one embodiment.

Now referring to FIG. 6, a method 600 is shown according to one embodiment. The method 600 may be performed in accordance with the present invention in any of the environments depicted in FIGS. 1-5 among others, in various embodiments. Of course, more or less operations than those specifically described in FIG. 6 may be included in method 600, as would be understood by one of skill in the art upon reading the present descriptions.

Each of the steps of the method 600 may be performed by any suitable component of the operating environment. For example, in various embodiments, the method 600 may be partially or entirely performed by a microprocessor, a server, a mainframe computer, a processing circuit having one or more processors therein, or some other device comprising one or more processors. The processing circuit, e.g., processor(s), chip(s), and/or module(s) implemented in hardware and/or software, and preferably having at least one hardware component, may be utilized in any device to perform one or more steps of the method 600. Illustrative processors include, but are not limited to, a MPU, a CPU, an ASIC, a FPGA, etc., combinations thereof, or any other suitable computing device known in the art.

In one embodiment, the operating environment may include a data system that may be one of a cluster of additional systems within the environment. In another embodiment, the data system may include a server, a personal computer, a mobile device, or any device capable of executing program instructions. In yet another embodiment, the data system may be included within a virtual storage environment. For example, the data system may be part of a VSAM environment.

As shown in FIG. 6, method 600 may start with operation 602, where an unstructured data record is received. This unstructured data record may be stored according to any known format, and may be received as part of a larger collection or set of unstructured data records, such as in a database, a stream of data, etc.

In operation 604, the unstructured data record is parsed to determine a characterization of the unstructured data record. In one embodiment, a known and available parser may be used to parse the unstructured data record. In an alternate embodiment, a proprietary and/or customized parser may be employed to parse the unstructured data record, which may be provided by a user, administrator, or some other person or entity which has knowledge of the format in which the unstructured data record is stored.

In an alternate index record, the characterization of the unstructured data record indicates the format in which information is stored in the data record. In one embodiment, the characterization of the unstructured data record includes determination of at least the following information: a total length of the record, a number of fields in the unstructured data record (which may be different or the same across all unstructured data records in the collection), a length for the various fields in the unstructured data record (these values typically will be unique for each unstructured data record in the collection), and an order of the fields as stored in the unstructured data record (typically, for any two unstructured data records which include the same fields, the order of the fields will be the same; however, the order of fields may change for unstructured data records which include different fields).

In operation 606, a first key pair that comprises a primary key-name associated with a primary key-value is obtained. In one embodiment, the first key pair may be obtained by searching the unstructured data record for the specified primary key-name. The primary key-name is used for all records stored to a data set in a structured database, while the first key-value is unique to each particular data record therein.

In another embodiment, the first key pair may be obtained by generating, in response to no primary key-name being present in the unstructured data record, the primary key-name that is or will be associated with the collection or set of unstructured data records that includes the unstructured data record, all of which are to be stored to the structured database. The primary key-name is used for all unstructured data records in the set of unstructured data records so that a consistent key-name is associated to all documents within the collection that will be stored to the structured database. In addition, in response to no key-value being present in the unstructured data record, the first key-value is generated that is associated with the unstructured data record via inclusion of an integer value that is unique for the particular unstructured data record.

In one embodiment, the integer value is created by incrementing an integer value from a last used value by one, and selecting a resulting incremented integer as the first key-value, e.g., 0000+1=0001, 0001+1=0002, . . .

According to another embodiment, the first key pair is obtained by identifying the primary key-name from the collection or set of unstructured data records from one or more of the unstructured data records in the set. In this embodiment, each unstructured data record in the set of unstructured data records includes the primary key-name somewhere in the data record itself. Moreover, this primary key-name is unique from other primary key-names used in other data sets stored to the structured database. In this way, a primary key-name is provided that is specific to the set of unstructured data records and distinguishes these data records, after being stored as a data set to the structured database, from other data sets stored therein.

In a further embodiment, the first key-value that is associated with the unstructured data record is generated by selecting an integer value that is not used as a key-value in any other unstructured data records of the collection or set of unstructured data records. In this way, the unstructured data record may be distinguished from all other data records in the collection or set of unstructured data records by the key-values included therein.

In operation 608, the primary key-value is hashed to obtain a hash value. Any known hashing algorithm may be used to create the hash value. In preferred approaches, the hashing algorithm provides a minimal number of collisions based on any anticipated input, e.g., the unstructured data records.

In one embodiment, the hashing algorithm may be applied to the entire first key pair instead of just the first key-value. In a further embodiment, method 600 may include identifying metadata from the unstructured data record. In this embodiment, the hashing algorithm may be applied to the entire first key pair in addition to the metadata, instead of just the first key-value. According to this approach, the unstructured data record is updated with the hash value based on the first key pair and the metadata, in creation of the modified data record.

In operation 610, the unstructured data record is updated to include the hash value as an indexing key, thereby creating a modified data record that may be searched for in a structured framework using an index of the structured framework that will include the indexing key for the modified data record.

In operation 612, the modified data record is stored in the structured database. In addition, in some approaches, all remaining unstructured data records from the collection or set of unstructured data records related to the modified data record may also be stored to the structured database after modification according to method 600.

In operation 614, the index of the structured database is updated to include an entry for the modified data record. The entry that is included in the index includes at least the hash value, which may be reverse hashed in order to obtain at least the first key value which is associated with the unstructured data record. Moreover, after updating the index, the unstructured data record may be searched for using the index, so that it may be located rapidly, which is an improvement over conventional techniques which rely on slower and/or more cumbersome techniques for locating unstructured data records in a structured or unstructured framework.

In some approaches, the index of the structured database may be updated to include entries for all remaining unstructured data records from the collection or set of unstructured data records in accordance with method 600.

According to one embodiment, method 600 may further include receiving a request to access the unstructured data record. This request may include the hash value specific to the desired data record, or the primary key-name:key-value pair, or just the primary key-value specific to the desired data record. Method 600 may further include querying the index of the structured database (using the hash value) to determine a location of the modified data record. After the modified data record (which was an unstructured data record prior to being stored to the structured database) is located, the original unmodified data record portion of the modified data record may be output (e.g., printed, displayed to a monitor or screen, transferred or otherwise sent to a remote computer, etc.) in response to receiving the request to access the unstructured data record.

In accordance with another embodiment, method 600 may include creating a secondary index for the structured database. In this embodiment, each entry in the secondary index is related to one data record of the structured database. Each entry includes at least the following information: metadata of a particular data record, a number of base pointers for the particular data record, a version indicator for the secondary index, a length for a secondary index key, a value for the secondary index key, and one or more base keys. Each of these fields are described in more detail later on. The one or more base keys are hash values that match, on an individual basis (e.g., a one-to-one basis where a different base key is matched for each of the hash values), a hashed value of an individual primary key-value of a particular unstructured data record stored as a modified data record to the structured database. The structured database is searchable using the one or more base keys, such that after the secondary index is consulted using one of the base pointers for the particular data record, one or more entries in the primary index may be determined using one or more of the base keys, thereby allowing the desired data record(s) to be located within the structured database.

Method 600 may be performed with a data system that utilizes VSAM, such as within an IBM® z/OS® environment, or any other system that utilizes VSAM as would be known in the art, in various approaches.

Method 600 may be implemented in a system and/or a computer program product. For example, a system may include a processing circuit and logic integrated with the processing circuit, executable by the processing circuit, or integrated with and executable by the processing circuit. By integrated with, what is meant is that the processing circuit is a hardware processor that has hardcoded logic included therewith, such as an ASIC, a FPGA, etc. By executable by, what is meant is that the processing circuit is configured to execute software logic to achieve functionality dictated by the software logic, with the processor possibly being a MPU, a CPU, a microprocessor, etc. The logic is configured to cause the processing circuit to perform method 600, and is stored to a computer readable storage medium accessible to the processing circuit.

In another example, a computer program product may include a computer readable storage medium having program instructions embodied therewith. The computer readable storage medium may be any suitable storage device known in the art that is configured to store and allow computer access to information stored therein. In this embodiment, the embodied program instructions are executable by a processing circuit to cause the processing circuit to perform method 600.

Some benefits of the embodiment described in FIG. 6 include faster access speed to the unstructured data after being stored to the structured framework, and enhanced searchability via the primary index (and any alternate indexes created based on the unstructured data). Moreover, an entire data set (which may include a plurality of data records therein) does not get rewritten when updating one or more data records therein, in contrast to unstructured data that is stored in data sets as a stream-of-bytes, which relies on the entire data set being rewritten to update any of the data records therein. Unstructured data that is stored to the structured framework according to the present embodiment may be updated at a document or record level, reducing the overall amount of I/O that is utilized in the update process and increasing performance of the structured database in association with processing the unstructured data records stored therein.

An unstructured data record may have any particular format and may be stored to an unstructured framework of any known type. In this example, assume that the unstructured data records are BSON and/or JSON documents, and that the unstructured database is a NoSQL database. Each BSON and/or JSON document stored to a NoSQL database includes a set of key-name:key-value pairs which are stored as a sequence of characters. A group of these documents is referred to as a collection or database. A VSAM database is also a collection of records, but each record has a consistent primary key that is specified by offset and length stored within each record specific to a particular data set stored to the VSAM database. One significant difference between a NoSQL database and a VSAM database is that each VSAM key is constructed from data from within the record via a fixed offset, while NoSQL documents contain key and value pairs that are stored in the data, but have no fixed offset for each pair.

In this example, assume that a document stored using the JSON format includes this string of characters:

{"firstname":"Tom","lastname":"Jones","zipcode": 11111}

There are three key-name:key-value pairs in this string of characters. The first key-name is "firstname" and has a key-value of "Tom". The offset of this particular field is 1, as the first character of the key-name starts at position 1 in the key-name:key-value string (using 0-based indexing). However, given the variable length of the field, the offset of the second field is not known for certain without examining the document, and may change or be altered over the lifetime of the document. Each field is referenced only by the name preceding the colon, and the data value follows the colon before the next comma or closing brace.

Conversely, VSAM records use a format where an offset for each data value is fixed and does not change. Additionally, VSAM does not store the key-name in the data, unlike an unstructured document like JSON or BSON. For example, assuming that the same information is being stored in a record as in the preceding example, a VSAM record may have the following format:

[Tom.....Jones...1111]

The VSAM key for this record is constructed based on an offset and length. For example, a key with an offset of 0 and a length of 8, e.g., KEY(0 8), would result in a key that organizes the data based on the first name (offset 0 length of 8).

In accordance with one embodiment, an unstructured document may be stored within the framework of a VSAM database to allow VSAM requests to quickly find unstructured documents within a VSAM database based on a key-name:key-value pair. This leverages both the flexibility of unstructured data and the speed of VSAM indexing.

In this embodiment, each unstructured document is either assigned a consistent key-name or a consistent key-name within each unstructured record is discovered. This key-name is used with associated key-values to construct the VSAM primary key. The VSAM primary key is used to build the VSAM index for locating the document within a VSAM database on which the VSAM index is constructed. In a specific embodiment, a default key may be used for all unstructured data records, such as "_id" or some other suitable default key string that is unlikely to appear in the document already. In a second embodiment, in response to a user failing to provide a document that contains the key-name:key-value pair that is used for indexing, the key-name is automatically inserted into the unstructured document and a value is generated for the corresponding key-value. In a further implementation, this key-value may be an integer value that increases for each additional record and starts at 1 with a predetermined length consistent with the key-value length, e.g., "00000001," "00000002," etc. This default key-name is set during data set definition according to one approach.

In response to a PUT or UPDATE request for a specific document being provided to VSAM, a passed document (the request that is forwarded to VSAM) may be scanned for the key-name:key-value pair specified in the request, in one embodiment. The key-value from this pair is then hashed into a fixed-length hash value field (such as 64 bytes, 128 bytes, 256 bytes, or some other suitable predetermined value). In response to the key-name not being found in the passed document, the requested key-name is automatically added and a key-value is generated, which may be based on an incremental counter or some other systematic method of generating unique key-values which will not be duplicated within the database. This value is then combined with internal metadata taken from the document and added to the original document.

For example, if a database request is issued for a PUT on the following document, {"_id":0001,"firstname":"John", "lastname":"Snow" }, the method looks for the _id key-name field and uses the key-value of 0001, which is then hashed to a predetermined fixed-length value. This hashing may be performed using any hashing algorithm, as long as it generates a minimum of collisions for any possible input. This value is combined with the original document, and possibly some metadata, to produce a hashed ID. In one example, the hashed ID may be: <hashed_id field for fixed number of bytes+reserved space><metadata>{"_id":0001, "firstname":"John", "lastname":"Snow" }. This new record is passed to the underlying VSAM structure to store inside a VSAM data set and indexed based on the newly constructed unique key. This results in a VSAM data set with each VSAM record holding one document. In this example, VSAM indexes the record based on a first threshold number of bytes of the record, e.g., the first 66 bytes, the first 132 bytes, the first 264 bytes, etc., by using a VSAM index offset of 0 and a length corresponding to the threshold number of bytes.

In another embodiment, for a GET DIRECT request, a value may be passed to the VSAM structure, such as by a user, administrator, or some other routine. In one example, a value may be passed that specifies "GET 0001". In this embodiment, this value (0001) is hashed using the same hashing algorithm described above, to create a VSAM key. This created VSAM key is passed to the underlying VSAM structure, such as via a GET DIR request. In the example of GET 0001, the 0001 value is hashed to a predetermined length, such as 128 bytes, to create a hash value. The reserve space is concatenated, and this hashed value is submitted to the VSAM structure as the VSAM key, such as via an RPL request.

In another embodiment, ERASE functionality works similar to the GET DIRECT request, where the value passed is hashed and the VSAM key is constructed from the hashed value. Then, the ERASE request is passed to the underlying VSAM structure.

In one example, a typical BSON object may be stored in a VSAM record as shown below.

BSON in UTF-8 (simple case, just "_id:00001")
HEX: 13000000 02 5F6964 00 05000000 3030303031 00
Fields: total length, type, "_id", end indicator, length, "0 0 0 0 1", end indicator
Or to break it out by field:
Total length: x'13000000' (little-endian)
Type: x'02'
Key "_id": x'5F6964'
End marker: x'00'
Value length: x'05000000' (little-endian)
Value "00001": x'3030303031'
End marker: x'00'

In this example, the data that is stored inside a VSAM record may include the following information:
000000  4F564AA0  14F4C21C  28C71304  ED75EA01
916E8199    DA4F9A75    7924235B    6056D613
*|.¢..4B..G.......>...|.....$-.O.*
000020  88EA7F08  04A56275  293D33EB  713FFB78
E2AB6E7C    F6245A45    9FD7DC12    BD77DC68
*.."............S.>@6.!.¤P.......*
000040  00000000  00000000  00000000  00000028
00000000    00000000    00000000    00000000
*...............................*
000060  00000000  00000000  00000000  00000000
00000000    00000000    00000000    00000000
*...............................*
000080  00000001  00000001  00000000  00049000
00D11014    F0D1B771    06000000    07D80001
*..........{.....J..0J.......Q..*
0000A0  E2E8E2E3  C5D4F140  01130000  00025F69
64000500 00003030 30303100 *SYSTEM1......Λ............*

In this example, using hexadecimal numbering, the KEY is located from offset x'00' to x'83'. Metadata for the key is located from offset x'84' to x'A9', and the actual BSON document prior to key creation and hashing is located from offset x'AB' to x'BE'. Moreover, in a further example, the GET FRD interface may be used to return the first document in the collection. If this GET FRD is followed by a GET SEQ, each record will be returned sequentially in the hashed key sequence, starting with the first document to match the hashed key, all the way through the VSAM data set until the last document is returned.

According to one embodiment, an application layer that operates on top of the methods described herein may scan those returned documents to search for a specific value among the key-name:key-value pairs. In addition, as described previously, alternate keys may be created, which are based on a key-name:key-value pair, just like a primary key. An alternate index (AIX) may be created which scans all of the documents in the data set, searches for the key-name (from the key-name:key-value pair), and then returns a VSAM record that pairs the alternate key to the primary key. This data may be used to look up documents based on the alternate key-name:key-value pair.

According to one embodiment, for alternate keys that are non-unique, subsequent GET requests return each document in the order that they are stored in the alternate index. In response to a user initiating a look up for a value and a specific key-name:key-value pair with this new alternate index, the user instructs the interface to use a specific alternate index (PATH OPEN), and then issues a GET request with the value requested. In response to such a request, the alternate index is searched to find the primary key that corresponds with the alternate key. Once that information is obtained, the primary index is searched for the primary key which points directly to the document requested, which may then be returned to the user.

Figure 7:
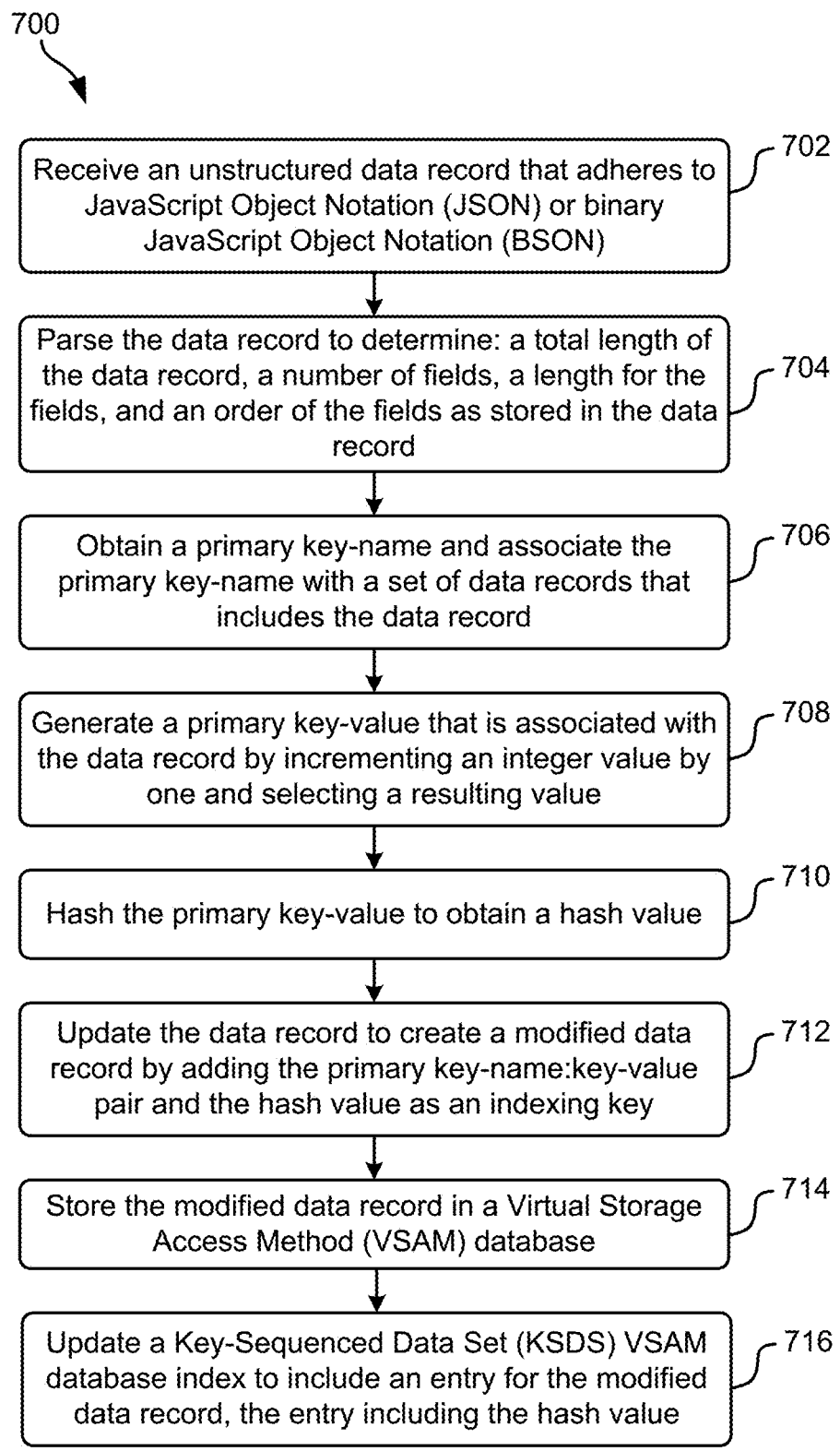
FIG. 7 shows a flowchart of a method, according to another embodiment.

Now referring to FIG. 7, a method 700 is shown according to one embodiment. The method 700 may be performed in accordance with the present invention in any of the environments depicted in FIGS. 1-5 among others, in various embodiments. Of course, more or less operations than those specifically described in FIG. 7 may be included in method 700, as would be understood by one of skill in the art upon reading the present descriptions.

Each of the steps of the method 700 may be performed by any suitable component of the operating environment. For example, in various embodiments, the method 700 may be partially or entirely performed by a microprocessor, a server, a mainframe computer, a processing circuit having one or more processors therein, or some other device comprising one or more processors. The processing circuit, e.g., processor(s), chip(s), and/or module(s) implemented in hardware and/or software, and preferably having at least one hardware component, may be utilized in any device to perform one or more steps of the method 700. Illustrative processors include, but are not limited to, a MPU, a CPU, an ASIC, a FPGA, etc., combinations thereof, or any other suitable computing device known in the art.

In one embodiment, the operating environment may include a data system that may be one of a cluster of additional systems within the environment. In another embodiment, the data system may include a server, a personal computer, a mobile device, or any device capable of executing program instructions. In yet another embodiment, the data system may be included within a virtual storage environment. For example, the data system may be part of a VSAM environment.

As shown in FIG. 7, method 700 may start with operation 702, where an unstructured data record that adheres to JavaScript Object Notation (JSON) or binary JavaScript Object Notation (BSON) is received, such as at a database management interface or some other logical construct or physical device that is configured to manage a structured database.

In operation 704, the data record is parsed, using a proprietary or user-provided parser, to determine at least the following information: a total length of the unstructured data record, a number of fields in the unstructured data record, a length for the fields in the unstructured data record, and an order of the fields as stored in the unstructured data record.

In operation 706, a primary key-name is obtained and the primary key-name is associated with a set of data records that includes the unstructured data record. These other data records in the set of data records may be associated with the unstructured data record after being stored to the structured database in one approach.

In operation 708, a primary key-value is generated that is associated with the unstructured data record. In one approach, the primary key-value may be generated by incrementing an integer value by one and selecting a resulting value as the primary key-value. In another approach, a random number may be selected, as long as it has not been utilized for any other data records within a data set stored to the structured database that includes the unstructured record.

In operation 710, the primary key-value in a primary key-name:key-value pair is hashed, using any known hashing algorithm, to obtain a hash value. The hashing algorithm should avoid collisions for all data records within the data set that includes the unstructured data record.

In operation 712, the unstructured data record is updated or rewritten by adding or including, with the original data therein, the primary key-name:key-value pair and the hash value as an indexing key to create a modified data record.

In operation 714, the modified data record is stored in a VSAM database that is searchable via a primary index, e.g., a KSDS.

In operation 716, the index (KSDS) of the VSAM database is updated to include an entry for the modified data record. This entry includes, at a minimum, the hash value created from the primary key-value of the unstructured data record.

In one embodiment, method 700 may include identifying metadata from the data record, and updating the data record with the metadata in association with the primary key-name:key-value pair and the hash value in creation of the modified data record.

In another embodiment, method 700 may include receiving a request to access the data record. In this embodiment, the request may include the primary key-name:key-value pair, the hash value specific to the data record, or the primary key value specific to the data record. After receiving the request, the primary key-value of the primary key-name:key-value pair may be hashed to obtain the hash value, using a reverse hashing algorithm to the hashing algorithm that is used when storing the data records to the database. Thereafter, the KSDS VSAM database index may be queried to determine a location of the modified data record within the database, and the portion of the modified data record that comprises the data record may be output in response to receiving the request to access the data record.

According to another embodiment, method 700 may include creating a secondary index for the VSAM database. In this embodiment, each entry in the secondary index is related to one data record of the VSAM database. Moreover, each entry in the secondary index includes at least the following information: metadata of a particular data record, a number of base pointers for the particular data record, a version indicator for the secondary index, a length for a secondary index key, a value for the secondary index key, and one or more base keys. The one or more base keys are hash values that match, on an individual basis, a hashed value of an individual primary key-value of a particular data record stored as a modified data record to the VSAM database. In addition, the VSAM database is searchable using the one or more base keys.

Method 700 may be performed with a data system that utilizes VSAM, such as within an IBM® z/OS® environment, or any other system that utilizes VSAM as would be known in the art, in various approaches.

Method 700 may be implemented in a system and/or a computer program product. For example, a system may include a processing circuit and logic integrated with the processing circuit, executable by the processing circuit, or integrated with and executable by the processing circuit. By integrated with, what is meant is that the processing circuit is a hardware processor that has hardcoded logic included therewith, such as an ASIC, a FPGA, etc. By executable by, what is meant is that the processing circuit is configured to execute software logic to achieve functionality dictated by the software logic, with the processor possibly being a MPU, a CPU, a microprocessor, etc. The logic is configured to cause the processing circuit to perform method 700, and is stored to a computer readable storage medium accessible to the processing circuit.

In another example, a computer program product may include a computer readable storage medium having program instructions embodied therewith. The computer readable storage medium may be any suitable storage device known in the art that is configured to store and allow computer access to information stored therein. In this embodiment, the embodied program instructions are executable by a processing circuit to cause the processing circuit to perform method 700.

Some benefits of the embodiment described in FIG. 7 include faster access speed to the unstructured data after being stored to the structured framework, and enhanced searchability via the primary index (and any alternate indexes created based on the unstructured data). Moreover, an entire data set (which may include a plurality of data records therein) does not get rewritten when updating one or more data records therein, in contrast to unstructured data that is stored in data sets as a stream-of-bytes, which relies on the entire data set being rewritten to update any of the data records therein. Unstructured data that is stored to the structured framework according to the present embodiment may be updated at a document or record level, reducing the overall amount of I/O that is utilized in the update process and increasing performance of the structured database in association with processing the unstructured data records stored therein.

Figure 8:
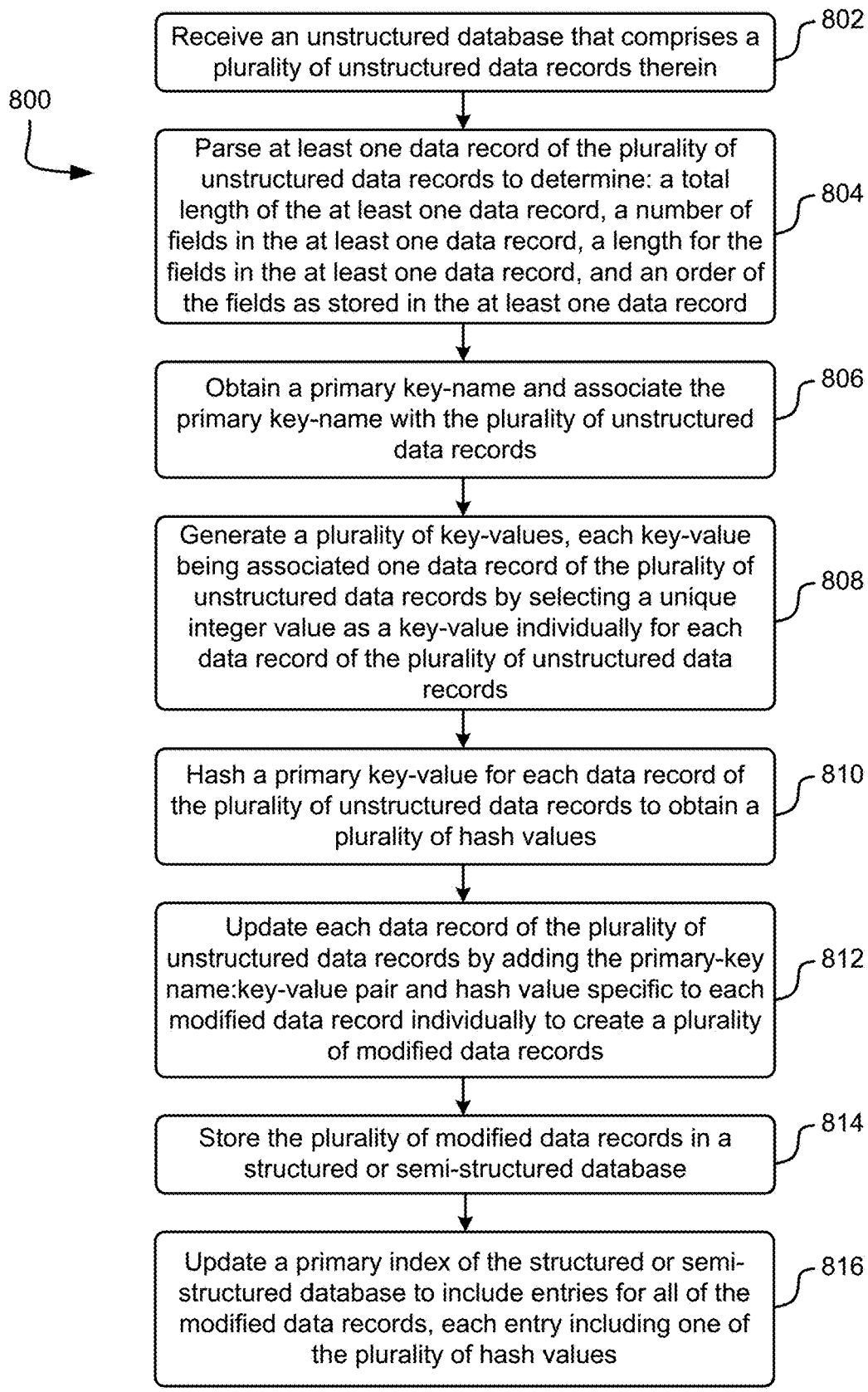
FIG. 8 shows a flowchart of a method, according to yet another embodiment.

Now referring to FIG. 8, a method 800 is shown according to one embodiment. The method 800 may be performed in accordance with the present invention in any of the environments depicted in FIGS. 1-5 among others, in various embodiments. Of course, more or less operations than those specifically described in FIG. 8 may be included in method 800, as would be understood by one of skill in the art upon reading the present descriptions.

Each of the steps of the method 800 may be performed by any suitable component of the operating environment. For example, in various embodiments, the method 800 may be partially or entirely performed by a microprocessor, a server, a mainframe computer, a processing circuit having one or more processors therein, or some other device comprising one or more processors. The processing circuit, e.g., processor(s), chip(s), and/or module(s) implemented in hardware and/or software, and preferably having at least one hardware component, may be utilized in any device to perform one or more steps of the method 800. Illustrative processors include, but are not limited to, a MPU, a CPU, an ASIC, a FPGA, etc., combinations thereof, or any other suitable computing device known in the art.

In one embodiment, the operating environment may include a data system that may be one of a cluster of additional systems within the environment. In another embodiment, the data system may include a server, a personal computer, a mobile device, or any device capable of executing program instructions. In yet another embodiment, the data system may be included within a virtual storage environment. For example, the data system may be part of a VSAM environment.

As shown in FIG. 8, method 800 may start with operation 802, where an unstructured database is received. The unstructured database, which may also be referred to as a non-relational database, includes a plurality of unstructured data records therein. The unstructured data records may be stored according to any known format.

In operation 804, at least one data record of the plurality of unstructured data records is parsed, such as by a proprietary or user-provided parser specific to the format in which the unstructured data records are stored, to determine at least the following information: a total length of the unstructured data record, a number of fields in the at least one data record, a length for the fields of the at least one data record, and an order of the fields as stored in the at least one data record. Each of these pieces of information help to define and explain how information is stored within the data records, which allows for such information to be identified and sorted in managing the data records in a structured database, even without rewriting the unstructured data records in a structured format.

In operation 806, a primary key-name is obtained and the primary key-name is associated with the plurality of unstructured data records. In one embodiment, associating the primary key-name includes storing the primary key-name in each of the unstructured data records.

According to one embodiment, the primary key-name may be generated by assigning a default identifier, such as "_id", "|name|", "% key", etc., or some other suitable marker or identifier which would not typically appear in the data records, to each of the unstructured data records that are stored within the same data set.

In operation 808, a plurality of key-values are generated, one for each unstructured data record of the plurality of unstructured data records. According to one embodiment, the plurality of key-values may be generated by selecting a unique integer value individually for each data record of the plurality of unstructured data records, and assigning these values to the unstructured data records individually.

In operation 810, a primary key-value for each data record of the plurality of unstructured data records is hashed, using a known hashing algorithm, to obtain a plurality of hash values on a one-to-one basis with the plurality of unstructured data records, e.g., one hash value for every one data record.

In operation 812, each data record of the plurality of unstructured data records are updated and/or modified by adding, individually, the primary key-name:key-value pair and hash value specific to each data record. This creates a plurality of modified data records with each modified data record including a corresponding primary key-name:key-value pair and hash value.

In another embodiment, the key-value in the primary key-name:key-value pair may be hashed prior to storing the value in the modified data record.

In operation 814, the plurality of modified data records are stored in a structured or semi-structured database, such as a VSAM database.

In operation 816, a primary index of the structured or semi-structured database is updated to include entries for all of the modified data records. In one embodiment, the primary index may be a KSDS VSAM database index. Each entry includes one of the plurality of hash values, thereby providing indexing to all of the unstructured data records via the primary index.

In one embodiment, method 800 may include identifying metadata from each of the data records of the plurality of unstructured data records. In this embodiment, each hash value of the plurality of hash values is created by hashing the primary key-value for each data record along with the identified metadata specific to a corresponding data record to provide the hash values. The "metadata" includes selected information from and/or about each of the unstructured data records individually, such as version number, date modified or created, or some other known information included in the data records that is likely to be different in at least some of the data records. Additional metadata includes, but are not limited to, names, addresses, times, values, parameters, etc.

According to another embodiment, method 800 may include creating one or more secondary indexes for the structured or semi-structured database. Each entry in a secondary index is related to a data record stored to the structured or semi-structured database, and may include at least the following information: metadata of a particular data record, a number of base pointers for the particular data record, a version indicator for the secondary index, a length for a secondary index key, a value for the secondary index key, and one or more base keys. Each of the base keys is a hash value that matches the hashed key-value of a particular data record stored to the base structured or semi-structured database. The structured or semi-structured database is searchable using the one or more base keys, and therefore the secondary index(es) may be used to obtain information that may be used to search the primary index and locate a particular data record.

Method 800 may be performed with a data system that utilizes VSAM, such as within an IBM® z/OS® environment, or any other system that utilizes VSAM as would be known in the art, in various approaches.

Method 800 may be implemented in a system and/or a computer program product. For example, a system may include a processing circuit and logic integrated with the processing circuit, executable by the processing circuit, or integrated with and executable by the processing circuit. By integrated with, what is meant is that the processing circuit is a hardware processor that has hardcoded logic included therewith, such as an ASIC, a FPGA, etc. By executable by, what is meant is that the processing circuit is configured to execute software logic to achieve functionality dictated by the software logic, with the processor possibly being a MPU, a CPU, a microprocessor, etc. The logic is configured to cause the processing circuit to perform method 800, and is stored to a computer readable storage medium accessible to the processing circuit.

In another example, a computer program product may include a computer readable storage medium having program instructions embodied therewith. The computer readable storage medium may be any suitable storage device known in the art that is configured to store and allow computer access to information stored therein. In this embodiment, the embodied program instructions are executable by a processing circuit to cause the processing circuit to perform method 800.

Some benefits of the embodiment described in FIG. 8 include faster access speed to the unstructured data after being stored to the structured framework, and enhanced searchability via the primary index (and any alternate indexes created based on the unstructured data). Moreover, an entire data set (which may include a plurality of data records therein) does not get rewritten when updating one or more data records therein, in contrast to unstructured data that is stored in data sets as a stream-of-bytes, which relies on the entire data set being rewritten to update any of the data records therein. Unstructured data that is stored to the structured framework according to the present embodiment may be updated at a document or record level, reducing the overall amount of I/O that is utilized in the update process and increasing performance of the structured database in association with processing the unstructured data records stored therein.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an ASIC, a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a CPU, an integrated circuit (IC), a graphics processing unit (GPU), etc.

It will be clear that the various features of the foregoing systems and/or methodologies may be combined in any way, creating a plurality of combinations from the descriptions presented above.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
   receiving an unstructured data record;
   obtaining a first key pair, comprising a primary key-name associated with a first key-value;
   hashing at least the first key-value to a predefined fixed length to obtain a hash value;
   combining the hash value with metadata corresponding to the unstructured data record and the unstructured data record to produce a hashed identifier (ID) having the hash value, metadata following the hash value in the hashed ID, and data in the unstructured data record following the metadata in the hashed ID;
   storing the hashed ID as a modified data record in a structured database;
   updating an index of the structured database to include an entry for the modified data record, the entry including the hash value;
   receiving a request to access the unstructured data record, the request including at least the first key-value;
   hashing the received first key-value to create a second hash value;
   querying the index of the structured database using the second hash value to determine a location of the modified data record in the structured database; and
   outputting a portion of the modified data record that comprises the unstructured data record in response to receiving the request to access the unstructured data record.

2. The method as recited in claim 1, comprising:
   identifying multiple items of the metadata from the unstructured data record; and
   combining the identified items of the metadata with the hash value and the data in the unstructured data record to produce the hashed ID.

3. The method as recited in claim 1, wherein the obtaining the first key pair further comprises:
   generating the primary key-name that is associated with a set of unstructured data records that includes the unstructured data record, the primary key-name being used for all unstructured data records in the set of unstructured data records; and
   generating the first key-value that is associated with the unstructured data record by incrementing an integer value by one and selecting a resulting incremented integer as the first key-value.

4. The method as recited in claim 1, wherein the obtaining the first key pair further comprises:
   identifying the primary key-name from a set of unstructured data records, wherein every unstructured data record in the set of unstructured data records includes the primary key-name; and
   generating the first key-value that is associated with the unstructured data record by randomly selecting a unique, non-sequential integer value that is not used as a key-value in any other unstructured data records of the set of unstructured data records.

5. The method as recited in claim 1, comprising receiving a second request to access the unstructured data record, the request including at least a second key-value; querying an alternate index of the structured database to find an entry that describes the second key-value; using information in the entry of the alternate index to query the index of the structured database to determine a location of the modified data record in the structured database; and outputting a portion of the modified data record that comprises the unstructured data record in response to receiving the second request to access the unstructured data record.

6. The method as recited in claim 1, further comprising creating an alternate index for the structured database, each entry in the alternate index being related to a corresponding one of the modified data records of the structured database,
   wherein the individual entries in the alternate index include:
   metadata of the corresponding modified data record;
   a number of base pointers for the corresponding modified data record;
   a version indicator for the alternate index;
   a length for an alternate index key;
   a value for the alternate index key; and
   one or more base keys, the one or more base keys being hash values that match, on an individual basis, a hashed value of an individual primary key-value of the corresponding modified data record stored in the structured database, wherein the structured database is searchable using the one or more base keys.

7. A computer program product, the computer program product comprising a computer readable storage medium having program instructions embodied therewith, the embodied program instructions being executable by a processing circuit to cause the processing circuit to:
   receive, by the processing circuit, a completely unstructured data record;
   obtain, by the processing circuit, a first key pair comprising a primary key-name associated with a first key-value;

hash, by the processing circuit, at least the first key-value to obtain a hash value;

obtain, by the processing circuit, multiple items of metadata corresponding to the unstructured data record;

combine, by the processing circuit, the hash value with the obtained metadata corresponding to the unstructured data record and the unstructured data record to produce a hashed identifier (ID) having the hash value, the obtained metadata following the hash value in the hashed ID, and data in the unstructured data record following the obtained metadata in the hashed ID;

store, by the processing circuit, the hashed ID as a modified data record in a structured database;

update, by the processing circuit, an index of the structured database to include an entry for the modified data record, the entry including the hash value;

receive, by the processing circuit, a request to modify the unstructured data record, the request including at least the first key-value;

hash, by the processing circuit, at least the received first key-value to create a second hash value;

query, by the processing circuit, the index of the structured database using the second hash value to determine a location of the modified data record in the structured database; and update, by the processing circuit, a portion of the modified data record that comprises the unstructured data record at a document level in response to receiving the request to modify the unstructured data record.

8. The computer program product as recited in claim 7, wherein the embodied program instructions are further executable by the processing circuit to cause the processing circuit to:

update, by the processing circuit, an alternate index to include an alternate index entry for the unstructured data record, the alternate index entry being created using a second key-value associated with the unstructured data record that is different than the first key-value used to create the hash value for the unstructured data record, the alternate index entry referencing hash value thereby being usable to reference the unstructured data record through the index of the structured database.

9. The computer program product as recited in claim 7, wherein the embodied program instructions that cause the processing circuit to obtain the first key pair causes the processing circuit to:

generate, by the processing circuit, the primary key-name that is associated with a set of unstructured data records that includes the unstructured data record, the primary key-name being used for all unstructured data records in the set of unstructured data records; and generate, by the processing circuit, the first key-value that is associated with the unstructured data record by incrementing an integer value by one and selecting a resulting incremented integer as the first key-value.

10. The computer program product as recited in claim 7, wherein the embodied program instructions that cause the processing circuit to obtain the first key pair causes the processing circuit to:

identify, by the processing circuit, the primary key-name from a set of unstructured data records, wherein every unstructured data record in the set of unstructured data records includes the primary key-name; and generate, by the processing circuit, the first key-value that is associated with the unstructured data record by randomly selecting a unique, non-sequential integer value that is not used as a key-value in any other unstructured data records of the set of unstructured data records.

11. The computer program product as recited in claim 7, comprising program instructions being executable by a processing circuit to cause the processing circuit to receive a second request to access the unstructured data record, the request including at least the second key-value; query an alternate index of the structured database to find an entry that describes the second key-value; use information in the entry of the alternate index to query the index of the structured database to determine a location of the modified data record in the structured database; and output a portion of the modified data record that comprises the unstructured data record in response to receiving the second request to access the unstructured data record.

12. The computer program product as recited in claim 7, wherein the embodied program instructions are further executable by the processing circuit to cause the processing circuit to create, by the processing circuit, an alternate index for the structured database, each entry in the alternate index being related to a corresponding one of the modified data records of the structured database, wherein the individual entries in the alternate index include:
second metadata of the corresponding modified data record;
a number of base pointers for the corresponding modified data record;
a version indicator for the alternate index;
a length for an alternate index key;
a value for the alternate index key; and
one or more base keys, the one or more base keys being hash values that match, on an individual basis, a hashed value of an individual primary key-value of the corresponding modified data record stored in the structured database, wherein the structured database is searchable using the one or more base keys.

13. A system, comprising:
a processing circuit;
a memory; and
logic stored to the memory, that when executed by the processing circuit causes the processing circuit to:
receive an unstructured data record;
obtain a first key pair, comprising a primary key-name associated with a first key-value;
hash at least the first key-value to a predefined fixed length to obtain a hash value;
obtain multiple items of metadata corresponding to the unstructured data record;
combine the hash value with the multiple items of the obtained metadata and the unstructured data record to produce a hashed identifier (ID) having the hash value, the obtained metadata following the hash value in the hashed ID, and data in the unstructured data record following the obtained metadata in the hashed ID;
store the hashed ID as a modified data record in a structured database;
update an index of the structured database to include an entry for the modified data record, the entry including the hash value;
update an alternate index to include an alternate index entry for the unstructured data record, the alternate index entry being created using a second key-value associated with the unstructured data record that is different than the first key-value used to create the hash value for the unstructured data record, the alternate index entry referencing information in the entry of the index of the structured database thereby being usable to reference the unstructured data record through the index of the structured database;

receive a request to modify the unstructured data record, the request including at least the second key-value;

query the alternate index of the structured database to find an entry that describes the second key-value;

use information in the entry of the alternate index to query the index of the structured database to determine a location of the modified data record in the structured database; and update, at a document level, a portion of the modified data record that comprises the unstructured data record in response to receiving the request to modify the unstructured data record.

14. The system as recited in claim 13, wherein the hash value is created by hashing the first key pair, and wherein the logic further causes the processing circuit to:
identify the multiple items of metadata from the unstructured data record.

15. The system as recited in claim 13, wherein the logic that causes the processing circuit to obtain the first key pair further causes the processing circuit to:
generate the primary key-name that is associated with a set of unstructured data records that includes the unstructured data record, the primary key-name being used for all unstructured data records in the set of unstructured data records; and
generate the first key-value that is associated with the unstructured data record by incrementing an integer value by one and selecting a resulting incremented integer as the first key-value.

16. The system as recited in claim 13, wherein the logic that causes the processing circuit to obtain the first key pair further causes the processing circuit to:
identify the primary key-name from a set of unstructured data records, wherein each unstructured data record in the set of unstructured data records includes the primary key-name; and
generate the first key-value that is associated with the unstructured data record by randomly selecting a unique, non-sequential integer value that is not used as a key-value in any other unstructured data records of the set of unstructured data records.

17. The system as recited in claim 13, wherein the logic further causes the processing circuit to:
receive a request to access the unstructured data record;
query the index of the structured database to determine a location of the modified data record; and
output a portion of the modified data record that comprises the unstructured data record in response to receiving the request to access the unstructured data record,
wherein the at least the first key-value is hashed into a hash value of the predefined fixed length,
wherein the at least the received first key-value is hashed into a second hash value of the predefined fixed length.

18. The system as recited in claim 13, wherein the logic further causes the processing circuit to create the alternate index for the structured database, each entry in the alternate index being related to a corresponding one of the modified data records of the structured database,
wherein each entry in the alternate index includes:
second metadata of a particular data record;
third metadata of the corresponding modified data record;
a number of base pointers for the corresponding modified data record;
a version indicator for the alternate index;
a length for an alternate index key;
a value for the alternate index key; and
one or more base keys, the one or more base keys being hash values that match, on an individual basis, a hashed value of an individual primary key-value of the corresponding modified data record stored in the structured database, wherein the structured database is searchable using the one or more base keys.

19. A method, comprising:
receiving an unstructured data record that adheres to binary JavaScript Object Notation (BSON);
generating a primary key-name and associating the primary key-name with a set of data records that includes the unstructured data record;
generating a primary key-value that is associated with the unstructured data record by incrementing an integer value by one and selecting a resulting value;
hashing at least the primary key-value to obtain a hash value;
combining the hash value with metadata corresponding to the unstructured data record and the unstructured data record to produce a hashed identifier (ID) having the hash value, metadata following the hash value in the hashed ID, and data in the unstructured data record following the metadata in the hashed ID;
wherein updating the unstructured data record does not include converting the unstructured data record to a different format;
storing the hashed ID as a modified data record in a Virtual Storage Access Method (VSAM) database;
updating a Key-Sequenced Data Set (KSDS) VSAM database index to include an entry for the modified data record, the entry including the hash value;
receiving a request to modify the unstructured data record, the request including at least the primary key-value;
hashing at least the received primary key-value to create a second hash value;
querying the KSDS VSAM database index using the second hash value to determine a location of the modified data record in the VSAM database; and
update a portion of the modified data record that comprises the unstructured data record in response to receiving the request to modify the unstructured data record.

20. The method as recited in claim 19, further comprising:
identifying multiple items of the metadata from the unstructured data record; and
combining the identified items of the metadata with the hash value and the data in the unstructured data record to produce the hashed ID.

21. The method as recited in claim 19, further comprising:
receiving a request to access the unstructured data record, the request including the primary key-name: key-value pair;
hashing the primary key-value to obtain the hash value;
querying the KSDS VSAM database index to determine a location of the modified data record based on the hash value; and
outputting a portion of the modified data record that comprises the unstructured data record in response to receiving the request to access the unstructured data record, wherein the at least the primary key-value is hashed into a hash value of a predefined fixed length,
wherein the at least the received primary key-value is hashed into a second hash value of the predefined fixed length.

22. The method as recited in claim 19, further comprising creating an alternate index for the VSAM database; and
updating the alternate index to include an alternate index entry for the unstructured data record, the alternate index entry being created using a second key-value associated with the unstructured data record that is different than the primary key-value used to create the hash value for the unstructured data record, the alternate index entry referencing the hash value thereby being usable to reference the unstructured data record through the VSAM database index;
wherein every entry in the alternate index includes:
metadata of the corresponding modified data record;
a number of base pointers for the corresponding modified data record;
a version indicator for the alternate index;
a length for an alternate index key;
a value for the alternate index key; and
one or more base keys, the one or more base keys being hash values that match, on an individual basis, a hashed value of an individual primary key-value of the corresponding modified data record stored in the VSAM database, wherein the VSAM database is searchable using the one or more base keys.

23. A method, comprising:
receiving an unstructured database that comprises a plurality of unstructured data records stored therein in accordance with an unstructured format;
parsing at least one data record of the plurality of unstructured data records to determine:
a total length of the at least one data record;
a number of fields in the at least one data record;
a length for the fields of the at least one data record; and
an order of the fields as stored in the at least one data record;
identifying metadata from the data records of the plurality of unstructured data records;
generating a primary key-name and associating the primary key-name with the plurality of unstructured data records;
generating a plurality of key-values, each key-value being associated with a respective data record of the plurality of unstructured data records by randomly selecting a non-sequential, unique integer value as a key-value individually for the respective data record of the plurality of unstructured data records;
hashing the primary key-name: key-value pair and multiple items of the identified metadata specific to the respective data record of the plurality of unstructured data records to obtain a plurality of hash values;
combining the hash values with the metadata corresponding to the corresponding unstructured data records and the unstructured data record to produce hashed identifiers (IDs) having the corresponding hash values, the corresponding metadata following the corresponding hash value in the respective hashed ID, and the data in the corresponding unstructured data record following the metadata in the respective hashed ID;
storing the hashed IDs as modified data records in a structured or semi-structured database;
updating a primary index of the structured or semi-structured database to include entries for all of the modified data records, each entry including one of the plurality of hash values;
receiving a request to access one of the unstructured data records;
creating a second hash value based on the request;
querying the primary index using the second hash value to determine a location of the corresponding modified data record in the structured or semi-structured database; and
outputting a portion of the modified data record that comprises the unstructured data record in response to receiving the request to access one of the unstructured data records.

24. The method as recited in claim 23, further comprising creating an alternate index for the structured or semi-structured database, each entry in the alternate index being related to a corresponding one of the modified data records stored to the structured or semi-structured database,
wherein each entry in the alternate index includes:
second metadata of the corresponding modified data record;
a number of base pointers for the corresponding modified data record;
a version indicator for the alternate index;
a length for an alternate index key;
a value for the alternate index key; and
one or more base keys, the one or more base keys being hash values that match, on an individual basis, a hashed value of an individual primary key-value of the corresponding modified data record stored to the structured or semi-structured database, wherein the structured or semi-structured database is searchable using the one or more base keys.

25. The method as recited in claim 23, wherein at least one of the unstructured data records includes information that does not have a predefined data model.

* * * * *